United States Patent [19]

Blizzard et al.

[11] Patent Number: 4,591,622

[45] Date of Patent: May 27, 1986

[54] SILICONE PRESSURE-SENSITIVE ADHESIVE PROCESS AND PRODUCT THEREOF

[75] Inventors: John D. Blizzard, Bay City; Terence J. Swihart, Essexville, both of Mich.

[73] Assignee: Dow Corning Corporation, Midland, Mich.

[21] Appl. No.: 665,797

[22] Filed: Oct. 29, 1984

[51] Int. Cl.$^4$ ............................................. C08L 83/06
[52] U.S. Cl. ............................................. 525/477; 524/500; 524/588; 525/478; 528/12; 528/21; 528/34
[58] Field of Search ............... 525/477, 478; 528/34; 524/588

[56] References Cited

U.S. PATENT DOCUMENTS

| | | | |
|---|---|---|---|
| 2,736,721 | 2/1956 | Dexter | 260/42 |
| 2,814,601 | 11/1957 | Currie et al. | 260/29.1 |
| 2,857,356 | 10/1958 | Goodwin | 260/42 |
| 3,528,940 | 9/1970 | Modic | 260/37 |
| 3,929,704 | 12/1975 | Horning | 260/29.1 SB |
| 3,983,298 | 9/1976 | Hahn et al. | 428/355 |
| 4,255,316 | 3/1981 | Blizzard | 260/37 SB |
| 4,309,520 | 1/1982 | Blizzard | 525/477 |
| 4,374,950 | 2/1983 | Shimizu | 528/34 |
| 4,417,042 | 11/1983 | Dziark | 528/34 |

FOREIGN PATENT DOCUMENTS 575664 5/1959 Canada .
711756 6/1965 Canada .

*Primary Examiner*—Wilbert J. Briggs, Sr.
*Attorney, Agent, or Firm*—Richard E. Rakoczy

[57] ABSTRACT

This invention relates to silicone pressure-sensitive adhesives having improved viscosity stability and film physical property stability upon aging by a method comprising the condensation of a benzene-soluble resin copolymer of 0.6 to 0.9 triorganoxiloxy units per $SiO_{4/2}$ unit which contains silicon-bonded hydroxyl radicals and a polydiorganosiloxane preferably containing silicon-bonded hydroxyl or other hydrolyzable endblocking radicals with a sufficient amount of an endblocking agent containing endblocking triorganosilyl units such as hexamethyldisilazane or trimethylmethoxysilane to result in a 1:0.8 to 1:3 mole ratio of silicon-bonded hydroxyl radicals and hydrolyzable endblocking radicals to total moles of triorganosilyl units provided by the endblocking agent. The condensation is conducted, when desirable, in the presence of a catalytic amount of a mild silanol condensation catalyst if one is not provided by endblocking agent and when, necessary, in the presence of an effective amount of an organic solvent such as xylene. Condensation is preferably conducted with heating under solvent reflux conditions.

34 Claims, No Drawings

SILICONE PRESSURE-SENSITIVE ADHESIVE PROCESS AND PRODUCT THEREOF

BACKGROUND OF THE INVENTION

This invention relates to a process for improving the solution viscosity and physical property stability upon aging of silicone pressure-sensitive adhesives containing residual silanol groups by endblocking such silanol groups with triorganosilyl endblocking units. This invention also relates to the silicone pressure-sensitive adhesive compositions obtained by such a method.

Silicone pressure-sensitive adhesives are commonly prepared by blending copolymeric resins composed of triorganosiloxy units and $SiO_{4/2}$ units with silanol-endblocked, polydiorganosiloxanes as shown in U.S. Pat. Nos. 2,736,721 (Dexter, issued 2/28/56) and 2,814,601 (Currie, et al, issued 11/26/84). Such blends, which are usually a solvent solution of the resin and polydiorganosiloxane, tend to increase in viscosity upon aging and the tack and adhesion values of films made from the pressure sensitive adhesives can also change with time. Such changes are not desirable.

Catalysts are often added to improve the physical properties of the silicone pressure-sensitive adhesive film. In addition to free radical polymerization catalysts such as peroxides, silanol condensation catalysts such as organometallic compounds and metal salts of carboxylic acids (see the Dexter Patent, above) and amines (see Canadian Pat. No. 575,664, Bartell, issued 5/12/59) have been suggested as curing catalysts for the heat cure of such films. Condensation cure is effected through the residual silanol radicals present in the resin copolymer which can contain up to about 3-4 weight percent of hydroxyl radicals bonded to silicon atoms based on the total weight of the copolymer resin ("silanol content"). The silanol content of the silanol-endblocked polydiorganosiloxanes will vary with the molecular weight of the polydiorganosiloxane present in the silicone pressure-sensitive adhesive blend. The presence of silanol condensation catalyst that was deliberately added or else is present in the resin copolymer or polydiorganosiloxane, e.g., an acid, because such catalysts were used in their manufacture can cause undesirable slow silanol condensation at room temperature with a resulting change in solution viscosity upon aging and can also result in changes in the pressure-sensitive adhesive film properties. Additives such as isopropanol have been used to improve the viscosity stability of blends of silicone copolymer resins and polydiorganosiloxanes as noted in U.S. Pat. No. 4,309,520 (Blizzard, issued 1/5/82), but the viscosity still changes upon aging.

Other silicone pressure-sensitive adhesive systems utilizing a cure system involving the platinum-catalyzed addition of silicon-bonded hydrogen atoms to silicon-bonded vinyl radicals have been taught such as in U.S. Pat. No. 3,983,298 (Hahn, et. al., issued 9/28/76). While Hahn uses a vinyl-endblocked polydiorganosiloxane as one component of his pressure sensitive adhesive compositions, the silicone resin copolymer employed therein can have a silanol content of as much as 3 to 4 percent by weight which, upon condensation, can result in a change in the stability of the viscosity and physical properties of the pressure-sensitive adhesive film upon aging.

Preparation of silicone pressure sensitive adhesives by the intercondensation of silanol-containing silicone copolymer resins with silanol-endblocked polydiorganosiloxanes by heating the mixture in the presence of a silanol condensation catalyst until the desired physical property characteristics are obtained is taught in U.S. Pat. Nos. 2,857,356 (Goodwin, issued 10/21/58); 3,528,940 (Modic, issued 9/15/70) and 3,929,704 (Horning, 12/30/75) and Canadian Pat. No. 711,756 (Pail, issued 6/15/65). This process still results in a product which contains residual silanol radicals which can condense and thereby affect the stability of the pressure-sensitive adhesive. The Pail Patent reacts silanol-functional silicone copolymer resins with low molecular weight silanol-endblocked polydiorganosiloxanes in the presence of an amine catalyst until the desired degree of adhesiveness is obtained.

Silicone pressure-sensitive adhesives have been made wherein the silicone copolymer resin has been further treated with a endblocking agent such as hexamethyldisilazane to reduce the silanol content of the copolymer to less than 1 percent by weight in U.S. Pat. No. 4,255,316 (Blizzard, issued 3/10/81). The '316 patent mentions that such reduced silanol content resin copolymers can be made with polydiorganosiloxanes having oxygen bonded terminating radicals such as H—, A'—, or A'$_3$Si— where A' is a monovalent hydrocarbon radical having from 1 to 6 inclusive carbon atoms; the oxygen-bonded terminating radicals are preferably H— or A'— to provide a reaction site for curing the fluid. The Blizzard '520 patent mentions the use of a pressure-sensitive adhesive formulation as a control material which was a cold mix of a silanol-endblocked polydiorganosiloxane gum with a blend of two silicone copolymer resins: a major portion of which had about 2 percent silanol content and a minor portion of a resin copolymer which had been treated with hexamethyldisilazane to provide a maximum of about 0.4 percent silanol content. The aforementioned '316 and '520 patents could still conceivably contain residual silanol groups which could affect stability upon aging.

SUMMARY OF THE INVENTION

One object of this invention is to provide a silicone pressure-sensitive adhesive having improved viscosity stability and film physical property stability upon aging as compared with cold blends of silicon-bonded hydroxyl radical containing ("silanol-containing") silicone copolymer resins of triorganosiloxy units and $SiO_{4/2}$ units with polydiorganosiloxanes having silanol or hydrolyzable endblocking radicals.

Another object of this invention is to provide silicone pressure-sensitive adhesives having improved viscosity stability upon aging which are prepared by the intercondensation of silanol-containing silicone copolymer resins of triorganosilyl units and polydiorganosiloxanes, preferably those polydiorganosiloxanes having silanol or hydrolyzable endblocking radicals.

These and other objects of the present invention are provided by a method of making a silicone pressure-sensitive adhesive by (I) mixing (A) a silanol-containing copolymer resin of 0.6 to 0.9 triorganosiloxy units per $SiO_{4/2}$ unit, (B) a polydiorganosiloxane, preferably one containing endblocking X radicals such as silanol or other hydrolyzable radicals, (C) a sufficient amount of an endblocking agent capable of providing endblocking triorganosilyl units such as hexamethyldisilazane or trimethylmethoxysilane to result in a 1:0.8 to 1:3 mole ratio of total moles of silicon-bonded hydroxyl radicals and hydrolyzable endblocking radicals to total moles of triorganosilyl units provided by the endblocking agent, (D) when desirable, a catalytic amount of a silanol condensation catalyst if one is not otherwise generated by (C), and (E), when necessary, an effective amount of an organic solvent to reduce the viscosity of the mixture of (A), (B), (C) and (D), and (II) condensing the mixture of (A), (B), (C) and (D) at least until a substantial amount of the endblocking triorganosilyl units have reacted with the silicon-bonded hydroxyl and hydrolyzable X radicals of said (A) and (B), and more preferably, at least until the rate of evolution of condensation by-products is substantially constant and the desired adhesive physical property profile is obtained. Condensation is preferably conducted with heating under solvent reflux conditions. After the condensation is complete, a solvent and/or other ingredients can be added to complete the production of the silicone pressure-sensitive adhesive.

As a result of the simultaneous condensation and endblocking of the resin copolymer and polydiorganosiloxane, the silanol content of the silicone pressure-sensitive adhesive product is reduced to a minimum thereby improving the viscosity stability and physical property stability upon aging of the resulting silicone pressure-sensitive adhesive. A further advantage of the present invention is that the physical properties of the resulting silicone pressure sensitive adhesive such as tack or adhesion can be modified by changing the level of endblocking agent and/or the type of endblocking agent employed.

DETAILED DESCRIPTION OF THE INVENTION

This invention relates to a method of making a silicone pressure-sensitive adhesive composition possessing improved stability upon aging which comprises the steps of:

(I) mixing (A) from 40 to 70 inclusive parts by weight of at least one benzene-soluble resin copolymer containing silicon-bonded hydroxyl radicals and consisting essentially of $R_3SiO_{\frac{1}{2}}$ units and $SiO_{4/2}$ units in a mole ratio of from 0.6 to 0.9 $R_3SiO_{\frac{1}{2}}$ units for each $SiO_{4/2}$ unit present, (B) from 30 to 60 parts by weight of at least one polydiorganosiloxane consisting essentially of ARSiO units terminated with endblocking $TRASiO_{\frac{1}{2}}$ units, each said polydiorganosiloxane having a viscosity of from 100 centipoise to 30,000,000 centipoise at 25° C., and each T is R— or X—, (C) a sufficient amount of at least one organosilicon endblocking agent capable of generating an endblocking triorganosilyl unit selected from the group consisting of $ZR_2Si$— units, $CH_3Z'$— units and $RZ''$— units to provide a 1:0.8 to 1:3 mole ratio of total silicon-bonded hydroxyl and X radicals present in said (A) and (B) to total endblocking triorganosilyl units provided by all endblocking agent present, said agent being selected from the group consisting of $ZR_2SiY$, $(ZR_2Si)_qD$, $CH_3Z'Y$, $(CH_3Z')_2O$, $RZ''Y'$, $(RZ'')_2O$ and $Z'''R_2SiY$, (D) when desirable, an additional catalytic amount of a mild silanol condensation catalyst in the event that none is provided by said (C), and (E) when necessary, an effective amount of an organic solvent which is inert with respect to (A), (B), (C) and (D) to reduce the viscosity of a mixture of (A), (B), (C), and (D), and (II) condensing the mixture of (A), (B), (C) and (D) at least until a substantial amount of the endblocking triorganosilyl units have reacted with the silicon-bonded hydroxyl radicals and X radicals of said (A) and (B), wherein each R is a monovalent organic radical selected from the group consisting of hydrocarbon radicals of from 1 to 6 inclusive carbon atoms, each X radical is selected from the group consisting of HO—, H— and R'O— radicals, each R' is an alkyl radical of from 1 to 4 inclusive carbon atoms, each Y radical is a monovalent hydrolyzable organic radical or HO—, each Y' is HO— or a monovalent hydrolyzable organic radical free of nitrogen, each A radical is selected from the group consisting of R— and halohydrocarbon radicals of from 1 to 6 inclusive carbon atoms, each Z radical is A— or QR''—, each R'' is a divalent alkylene radical of from 1 to 6 inclusive carbon atoms, each Q is an organofunctional monovalent radical selected from the group consisting of RCOE', RE'OC—, NC—, R'E'—, HO—, $G_2N$—, $HO(R''O)_n$—, and $G_2NCH_2CH_2NG$— where E' is —O—, —NH— or —S—, n has a value of from 1 to 6, Z' is

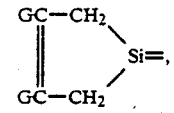

Z'' is

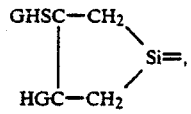

Z''' is selected from the group consisting of HSR''—, $HSCH_2CH_2NGR'$— and $HOCH_2CH_2SR''$— radicals, each G is R'— or H—, D is a divalent or trivalent organic radical capable of being hydrolyzed to release said endblocking silyl units and q has a value of 2 when D is a divalent radical and q has a value of 3 when D is a trivalent radical.

This invention also relates to the pressure-sensitive adhesive compositions obtained in accordance with that method.

The pressure-sensitive adhesive compositions are made in accordance with the present invention using from 40 to 70 inclusive parts by weight of silicone copolymer resins (A) and from 30 to 60 parts by weight of polydiorganosiloxanes (B) of the type which have been used in the past to make such compositions. More preferred are compositions employing from 45 to 60 parts by weight of resin copolymer (A) and from 40 to 55 parts by weight of polydiorganosiloxane (B).

The benzene-soluble silicone resin copolymers (A) are well-known materials. They contain silicon-bonded hydroxyl radicals in amounts which typically range from about 1 to 4 weight percent of silicon-bonded hydroxyl radicals and consist essentially of $R_3SiO_{\frac{1}{2}}$ units and $SiO_{4/2}$ units in a mole ratio of from 0.6 to 0.9 $R_3Si_{\frac{1}{2}}$ units for each $SiO_{4/2}$ unit present. Blends of two or more such copolymers may also be used. To be useful in the method of this invention, there should be at least some and preferably at least 0.5% silicon-bonded hydroxyl content to enable the polydiorganosiloxane component to copolymerize with the copolymer resin and/or to react with the endblocking agent being added. These resin copolymers are benzene-soluble resinous materials which are typically solids at room temperature and are prepared as, and usually, but not necessarily used as, a solution in an organic solvent. Typical organic solvents used to dissolve resin copolymer (A) include benzene, toluene, xylene, methylene chloride, perchloroethylene, naphtha mineral spirits and mixtures of these.

Resin copolymer (A) consists essentially of from 0.6 to 0.9 $R_3SiO_{\frac{1}{2}}$ units for every $SiO_{4/2}$ unit in the copolymer. There may also be a few mole percent of $R_2SiO$ units present in the copolymer provided that the presence of such units does not cause the ultimate product of the process of this invention to lose its ability to function as a pressure-sensitive adhesive. Each R denotes, independently, a monovalent hydrocarbon radical having from 1 to 6 inclusive carbon atoms such as methyl, ethyl, propyl, isopropyl, hexyl, cyclohexyl, vinyl, allyl, propenyl and phenyl. Preferably, the $R_3SiO_{\frac{1}{2}}$ units are $Me_2R'''SiO_{\frac{1}{2}}$ units wherein is $R'''$ is a methyl ("Me"), vinyl ("Vi") or phenyl ("Ph") radical. More preferably, no more than 10 mole percent of the $R_3SiO_{\frac{1}{2}}$ units present in resin copolymer (A) are $Me_2R''''SiO_{\frac{1}{2}}$ units and the remaining units are $Me_3SiO_{\frac{1}{2}}$ units where each $R''''$ is a methyl or a vinyl radical.

The mole ratio of $R_3SiO_{\frac{1}{2}}$ and $SiO_{4/2}$ units can be determined simply from a knowledge of the identity of the R radicals in the $R_3SiO$ units and the percent carbon analysis of the resin copolymer. In the preferred resin copolymer consisting of from 0.6 to 0.9 $Me_3SiO_{\frac{1}{2}}$ units for every $SiO_{4/2}$ unit, the carbon analysis has a value of from 19.8 to 24.4 percent by weight.

Resin copolymer (A) may be prepared according to Daudt et al., U.S. Pat. No. 2,676,182 (issued 4/20/54 and hereby incorporated by reference) whereby a silica hydrosol is treated at a low pH with a source of $R_3SiO_{\frac{1}{2}}$ units such as a hexaorganodisiloxane such as $Me_3SiOSiMe_3$, $ViMe_2SiOSiMe_2Vi$ or $MeViPhSiOSiPhViMe$ or triorganosilane such as $Me_3SiCl$, $Me_2ViSiCl$ or $MeViPhSiCl$. Such copolymer resins are typically made such that the copolymer resin contains about 1 to 4 weight percent of silicon-bonded hydroxyl radicals. Alternatively, a mixture of suitable hydrolyzable silanes free of R radicals may be cohydrolyzed and condensed. In this alternative procedure, it is a typical practice to further treat the copolymer product with a suitable silylating agent, such as hexamethyldisilazane or divinyltetramethyldisilazane, to reduce the silicon-bonded hydroxyl content of the copolymer product to less that 1 percent by weight. This step would not be necessary, but could be used, in the process of the present invention. Preferably, the resin copolymers employed contain from about 1 to 4 weight percent of silicon-bonded hydroxyl radicals.

Ingredient (B) is also a well-known material and is one or more polydiorganosiloxanes consisting essentially of ARSiO units terminated with endblocking $TRASiO_{\frac{1}{2}}$ units, each of which polydiorganosiloxanes has a viscosity of from 100 centipoise to 30,000,000 centipoise at 25° C. (100 millipascal-seconds to 30,000 pascal seconds (Pa.s) where 1 centipoise equals 1 millipascal second). As is well-known, viscosity is directly related to the average number of diorganosiloxane units present for a series of polydiorganosiloxanes of varying molecular weights which have the same endblocking units. Polydiorganosiloxanes having a viscosity of from about 100 to 100,000 centipoise at 25° C. range from fluids to somewhat viscous polymers. These polydiorganosiloxanes are preferably prereacted with resin copolymer (A) prior to condensation in the presence of endblocking agent (C) to improve the tack and adhesion properties of the resulting pressure-sensitive adhesive as will be further described. Polydiorganosiloxanes having viscosities in excess of 100,000 centipoise can typically be subjected to the condensation/endblocking step (II) of the present invention without prereaction. Polydiorganosiloxanes having viscosities in excess of 1,000,000 centipoise are highly viscous products often referred to as gums and the viscosity is often expressed in terms of a Williams Plasticity value (polydimethylsiloxane gums of about 10,000,000 centipoise viscosity typically have a Williams Plasticity Value of about 50 mils (1.27 mm) or more at 25° C.).

The polydiorganosiloxanes of (B) consist essentially of ARSiO units where each R is as defined above. Each A radical is selected from radicals such as R— or halohydrocarbon radicals of from 1 to 6 inclusive carbon atoms such a chloromethyl, chloropropyl, 1-chloro,-2-methylpropyl, 3,3,3,-trifluoropropyl and $F_3C(CH_2)_5$— radicals. Thus the polydiorganosiloxane can contain $Me_2SiO$ units, $PhMeSiO$ units, $MeViSiO$ units, $Ph_2SiO$ units, methylethylsiloxy units 3,3,3-trifluoropropyl units and 1-chloro, 2-methylpropyl units and the like. Preferably, the ARSiO units are selected from the group consisting of $R'''_2SiO$ units, $Ph_2SiO$ units and combinations of both where $R'''$ is as above, at least 50 mole percent of the $R'''$ radicals present in the polydiorganosiloxane (B) are methyl radicals and no more than 50 mole percent of the total moles of ARSiO units present in each polydiorganosiloxane of (B) are $Ph_2SiO$ units. More preferably, no more than 10 mole percent of the ARSiO units present in each polydiorganosiloxane (B) are $MeR''''SiO$ units where $R''''$ is as above defined and the remaining ARSiO units present in each polydiorganosiloxane are $Me_2SiO$ units.

Each polydiorganosiloxane (B) is terminated with endblocking units of the unit formula $TRASiO_{\frac{1}{2}}$ where R and A are as defined above and each T radical is R or X wherein each X radical is selected from the group consisting of HO—, H— and R'O— radicals where each R' is an alkyl radical of from 1 to 4 inclusive carbon atoms such as methyl, ethyl, n-propyl, and isobutyl radicals. The X radicals provide a site for reaction with the endblocking triorganosilyl units of ingredient (C) and also provide a site for condensation with other X radicals on polydiorganosiloxanes (B) or with the silicon-bonded hydroxyl groups present in resin copolymer (A). Use of polydiorganosiloxanes where T is HO— is most preferred because the polydiorganosiloxane (B) can then readily copolymerize with the resin copolymer (A). When an appropriate catalyst such as HCl which is generated when chlorosilanes are used or ammonia which is generated when organosilazanes are used as endblocking agents, triorganosiloxy (e.g., $R_3SiO_{\frac{1}{2}}$ such as $(CH_3)_3SiO_{\frac{1}{2}}$ or $CH_2=CH(CH_3)_2SiO_{\frac{1}{2}}$) unit terminated polydiorganosiloxanes can be employed because some of the triorganosiloxy units can be cleaved when the condensation reaction is conducted with heating. The cleavage exposes a silicon-bonded hydroxyl radical which can then condense with silicon-bonded hydroxyl radicals in the copolymer resin, with endblocking triorganosilyl units or with other polydiorganosiloxanes containing X radicals or silicon-bonded hydroxyl radicals exposed by cleavage reactions. Mixtures of polydiorganosiloxanes containing different substituent radicals may also be used.

Methods for the manufacture of such polydiorganosiloxanes are well known as exemplified by the following U.S. Pat. Nos.: 2,490,357 (Hyde); 2,542,334 (Hyde); 2,927,907 (Polmanteer); 3,002,951 (Johannson); 3,161,614 (Brown, et al.); 3,186,967 (Nitzche, et al.); 3,509,191 ((Atwell) and 3,697,473 (Polmanteer, et al.) which are hereby incorporated by reference.

To obtain pressure-sensitive adhesives which are to be cured by peroxide or through aliphatically unsaturated radicals present in resin copolymer (A) or polydiorganosiloxane (B), if resin copolymer (A) contains aliphatically unsaturated radicals, then polydiorganosiloxane (B) should be free of such radicals and viceversa. If both components contain aliphatically unsaturated radicals, curing through such radicals can result in products which do not act as pressure-sensitive adhesives.

The distinguishing feature of the present invention over other processes for making silicone pressure-sensitive adhesives is conducting the condensation of resin copolymer (A) and polydiorganosiloxane (B) in the presence of at least one organosilicon endblocking agent (C) capable of generating endblocking triorganosilyl units of the formula $ZR_2Si$-, $CH_3Z'$— units where $Z'$ is

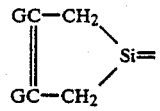

and $RZ''$— where $Z''$ is

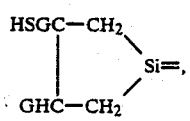

and $Z'''R_2Si$— units where $Z'''$ is $HSR''$— such as $HSCH_2CH_2CH_2$—, $HSCH_2CH_2NGR''$— such as $HSCH_2CH_2NH(CH_2)_3$— or $HOCH_2CH_2SR''$— such as $HOCH_2CH_2SCH_2CH_2CH_2$—. The $Z'$ radicals are silacyclopentenyl radicals and are described in Atwell U.S. Pat. No. 3,509,191 (issued 4/28/70) and the $Z''$ radicals are described in U.S. Pat. No. 3,655,713. The endblocking agent capable of providing such triorganosilyl units is selected from the group consisting of $ZR_2SiY$, $(ZR_2Si)_qD$, $CH_3Z'Y$, $(CH_3Z')_2O$, $RZ''Y'$, $(RZ'')_2O$ and $Z'''R_2SiY'$ where R is as previously defined and each G is $R'$— or $H$-. Preferably, the endblocking agent is selected from the group consisting of $ZR_2SiY$, $(ZR_2Si)_2D$ and mixtures thereof and each R present in the endblocking agent is a methyl or a phenyl radical. It is preferred to use endblocking agents having the same Y or D radicals if mixtures are to be used.

Each Y radical is HO— or a monoavalent hydrolyzable organic radical such as $R'O$—, halogen such as $Cl$— or $Br$—, amino such as $G_2N$— such as —$NR''''_2$, carboxyl such as $GCH_2COO$— such as acetoxy, $GCH_2CONH$— such as $CH_3CONH$—, urea derivatives such as $(C_2H_5)_2NCO(C_4H_9)$— and the like or $H$— where R' is as previously defined. Preferably, each Y is $R'O$—, $Cl$—, $HO$—, or $G_2N$— and more preferably, Y is $R'O$— or $Cl$—. Y' is $HO$— or a monovalent hydrolyzable organic radical free of nitrogen such as $R'O$—.

D is selected from the group consisting of divalent and trivalent hydrolyzable radicals such as —O—, —NG—, —NHCONH—, and =N— and q has a value of 2 when D is a divalent radical and q has a value of 3 when D is a trivalent radical. Preferably, q is 2 and D is —NH—.

Each Z radical is selected from radicals such as A- and $QR''$— radicals where A is as previously defined and $R''$ is a divalent alkylene radical of from 1 to 6 inclusive carbon atoms such as ethylene, propylene, 2-methylpropylene, and butylene.

Each Q is a monovalent organofunctional radical which is useful in altering the physical properties of the pressure-sensitive adhesive film. Endblocking agents containing $Z'''$ radicals can be used similarly. Preferably, the Q and $Z'''$ radicals do not condense with the silanol radicals present in the resin copolymer (A) and/or with the X radicals present in polydiorganosiloxane (B) during the condensation step (II) of the present invention. Q can be a monovalent radical selected from the group consisting of $RCOE'$— where $E'$ is —O—, —NH— or —S— such as RCOO— such as $CH_3COO$—, $CH_2=CCH_3COO$—, and $CH_3(CH_2)_3COO$—, RCONH— such as $CH_3CONH$—, and RCOS— such as $CH_3CH_2COS$—, $RE'OC$— such as $C_2H_5OOC$—, $CH_3CH_2CH_2CH_2NHOC$— and $CH_3CH_2CH_2SOC$—, cyano which is NC—, HO—, $R'E'$— such as $CH_3CH_2CH_2O$—, and $R'S$— such as $CH_3CH_2CH_2S$—, and $G_2N$— such as $H_2N$— and $C_2H_5NH$—, $HO(R''O)_n$— where n has a value of from 1 to 6 such as $HOCH_2CH_2O$—, $G_2NCHCH_2NG$— such as $H_2NCH_2CH_2NH$—.

Preferably, Z is selected from the group consisting of methyl, vinyl and 3,3,3-trifluoropropyl radicals and more preferably is a methyl or vinyl radical.

Endblocking agents capable of providing endblocking triorganosilyl units are commonly employed as silylating agents and a wide variety of such agents are known. A single endblocking agent such as hexamethyldisilazane can be employed or a mixture of such agents such as hexamethyldisilazane and sym-tetramethyldivinyldisilazane can be employed to vary the physical properties of the pressure-sensitive adhesive film. For example, use of an endblocking agent containing fluorinated triorganosilyl units such as $[(CF_3CH_2CH_2)Me_2Si]_2NH$ in the process of the present invention could result in a silicone pressure-sensitive adhesive having improved resistance to hydrocarbon solvents after the film is deposited and the presence of the fluorinated triorganosilyl units could affect the tack and adhesion properties of the pressure-sensitive adhesive when the R radicals present in the resin copolymer (A) and the polydiorganosiloxane (B) are substantially composed of methyl radicals. By employing endblocking agents containing higher carbon content silicon-bonded organic radicals such as ethyl, propyl or hexyl radicals, the compatibility of the silicone pressure-sensitive adhesive with organic pressure-sensitive adhesives could be improved to allow blending of such adhesives to obtain improved adhesive compositions. Use of endblocking agents having triorganosilyl units having organofunctional radicals such as amides, esters, ethers and cyano radicals could allow one to change the release properties of a pressure-sensitive adhesive made in accordance with the present invention. Likewise, organofunctional radicals present in the pressure-sensitive adhesive composition can be altered such as by hydrolyzing ROOCR"— radicals to generate HOOCR"— radicals which are converted to MOOCR" radicals where M is a metal cation such as lithium, potassium or sodium. The resulting composition may then exhibit release or other properties different from a composition containing RCOOR"— radicals.

Use of endblocking agents containing triorganosilyl units with unsaturated organic radicals such as vinyl can produce silicone pressure-sensitive adhesives which can be cross-linked through such groups. For example, an organosilicon cross-linking compound containing silicon-bonded hydrogen radicals can be added along with a noble metal such as a platinum metal or rhodium metal catalyst to a silicone pressure-sensitive adhesive composition made in accordance with the present invention which contains PhMeViSi— and Me₃Si— endblocking triorganosilyl units to produce a pressure-sensitive adhesive composition which cures via the platinum catalyzed addition of silicon-bonded hydrogen radicals to silicon-bonded vinyl radicals. Use of endblocking agents containing triorganosilyl units with phenyl radicals could improve the stability of the pressure-sensitive adhesive to heat.

Thus, the endblocking agent serves several purposes in the present invention because it removes silicon-bonded hydroxyl radicals which can affect the stability of the resulting pressure sensitive adhesive, it enables one to modify the properties of the adhesive without making substantial changes in the resin copolymer and polydiorganosiloxanes and by selecting an appropriate level of endblocking agent, one can alter the molecular weight of the condensation product of the resin copolymer (A) and polydiorganosiloxane (B) since the triorganosilyl units act as endblocking units.

In order to achieve the desired objective of the present invention, one must add at least a sufficient amount of one or more endblocking agents to provide at least a 0.8:1 mole ratio of total endblocking triorganosilyl units to total silicon-bonded hydroxyl radicals present in resin copolymer (A) and polydiorganosiloxane (B). A 1:1 ratio may not always be necessary since condensation between the resin copolymer (A) and polydiorganosiloxane (B) also effectively removes silicon-bonded hydroxyl radicals. The resin copolymer (A) will typically contain the majority of the silicon-bonded hydroxyl content present in the combination of resin copolymer (A) and polydiorganosiloxane (B). A number of methods for determining silicon-bonded hydroxyl content exist, but results with polymers of the resin copolymer (A) type tend to be variable. Therefore it is better to include a sufficient excess of endblocking agent to provide at least an 10% excess 0.88:1 mole ratio of endblocking triorganosilyl units to the silicon-bonded hydroxyl radicals. When the purpose is only to remove a substantial amount of the residual silicon-bonded hydroxyl content e.g., using a heating step to effect condensation of resin copolymer (A) with polydiorganosiloxane (B) in addition to endblocking, the minimum plus the aforementioned excess of endblocking agent is preferred.

When one desires to alter the properties of the pressure-sensitive adhesive by including endblocking agents with specific radicals, it is desirable to use a resin copolymer (A) that has a higher silicon-bonded hydroxyl content (e.g., 1–4 weight percent) so that more of the triorganosilyl units containing such radicals will be reacted into the condensation product of resin copolymer (A) and polydiorganosiloxane (B). Since a condensation process can also occur in the process of the present invention, inclusion of greater than the stoichiometric amount of endblocking triorganosilyl units relative to the silicon-bonded hydroxyl radicals and X radicals can affect the molecular weight of the condensation product which is the silicone pressure-sensitive adhesive. Use of more than a 1:3 mole ratio of total silicon-bonded hydroxyl radicals and X radicals present in resin copolymer (A) polydiorganosiloxane (B) to total endblocking triorganosilyl units provided by the endblocking agents added is believed to be excessive and wasteful.

Examples of endblocking agents are (Me₃Si)₂NH, (ViMe₂Si)₂NH, (MePhViSi)₂NH, (CF₃CH₂CH₂Me₂Si)₂NH, (Me₃Si)₂NMe, (ClCH₂Me₂Si)₂NH, Me₃SiOMe, Me₃SiOC₂H₅, Ph₃SiOC₂H₅, (C₂H₅)₃SiOC₂H₅, Me₂PhSiOC₂H₅, (i-C₃H₇)₃SiOH, Me₃Si(OC₃H₇),

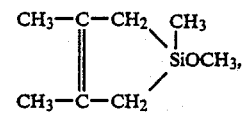

MePhViSiOMe, Me₃SiCl, Me₂ViSiCl, MePhViSiCl, (H₂C=CHCH₂)Me₂SiCl, (n-C₃H₇)₃SiCl, (F₃CCF₂CF₂CH₂CH₂)₃SiCl, NCCH₂CH₂Me₂SiCl, (n-C₆H₁₃)₃SiCl, MePh₂SiCl, Me₃SiBr, (t-C₄H₉)Me₂SiCl, CF₃CH₂CH₂Me₂SiCl, (Me₃Si)₂O, (Me₂PhSi)₂O, BrCH₂Me₂SiOSiMe₃, (p-FC₆H₄Me₂Si)₂O, (CH₃COOCH₂Me₂Si)₂O, [(H₂C=CCH₃COOCH₂CH₂)Me₂Si]₂O, [(CH₃COOCH₂CH₂CH₂)Me₂Si]₂O, [(C₂H₅OOCCH₂CH₂)Me₂Si]₂O, [(H₂C=CHCOOCH₂)Me₂Si]₂O,

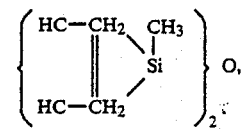

(Me₃Si)₂S, (Me₃Si)₃N, Me₃SiNHCONHSiMe₃, F₃CH₂CH₂Me₂SiNMeCOCH₃, (Me₃Si)(C₄H₉)NCON(C₂H₅)₂, (Me₃Si)PhNCONHPh, Me₃SiNHMe, Me₃SiN(C₂H₅)₂, Ph₃SiNH₂, Me₃SiNHOCCH₃, Me₃SiOOCCH₃, [(CH₃CONHCH₂CH₂CH₂)Me₂Si]₂O, Me₃SiO(CH₂)₄OSiMe₃, Me₃SiNHOCCH₃, Me₃SiC≡CH

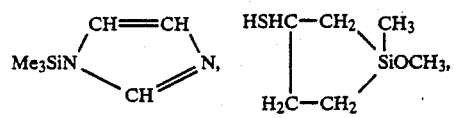

[HO(CH₂)₄Me₂Si]₂O, (HOCH₂CH₂OCH₂Me₂Si)₂O, H₂N(CH₂)₃Me₂SiOCH₃, CH₃CH(CH₂NH₂)CH₂Me₂SiOCH₃, C₂H₅NHCH₂CH₂S(CH₂)₆Me₂SiOC₂H₅, HSCH₂CH₂NH(CH₂)₄Me₂SiOC₂H₅, HOCH₂CH₂SCH₂Me₂SiOCH₃.

Preferably, the endblocking agents employed are of the type (AR₂Si)₂NH such as (Me₃Si)₂NH, AR₂SiOR' or AR₂SiCl.

A number of the above endblocking agents generate silanol condensation catalysts such as acids such as hydrogen chloride and bases such as ammonia or amines when the triorganosilyl unit reacts with silicon-bonded hydroxyl radicals and/or X radicals present in the resin copolymer (A) and polydiorganosiloxanes (B). As will be further described, the condensation step (II) of the present invention is preferably done with heating and the presence of the catalyst causes the condensation of the resin copolymer (A) and polydiorganosiloxanes (B) to take place at the same time that endblocking by the endblocking triorganosilyl units occurs. Depending on the method of manufacture employed, resin copolymer (A) and/or polydiorganosiloxane (B) may contain a sufficient level of residual catalyst to effect condensation and endblocking. Thus, if desired, an additional catalytic amount of a "mild" silanol condensation catalyst can be used where the term "mild" means that it causes the endblocking agent to condense with the resin copolymer (A) and the polydiorganosiloxane (B) while causing minimal siloxane bond rearrangement. Examples of "mild" catalysts are those known to be used as curing agents for pressure-sensitive adhesive compositions such as amines such as triethylamine and organic compounds such as tetramethylguanidine 2-ethylcaproate, tetramethylguanidine 2-ethylhexanoate and n-hexylamine 2-ethylcaproate. The additional catalyst (D) selected should not cause an excessive amount of cleavage of siloxane bonds in the resin copolymer (A) and/or polydiorganosiloxane (B) during the condensation reaction thereby resulting in gelation of the composition or a substantial loss of adhesive properties as is known to happen with organic tin catalysts and strong acids. Preferably, catalyst (D) is only used when no catalyst is provided by endblocking agent (C). Suitable catalysts and the selection of specific catalyst and amounts thereof for catalyzing the reaction of particular endblocking triorganosilyl units with the silicon-bonded hydroxyl radicals found on the organosiloxy units present in resin copolymer (A) and polydiorganosiloxane (B) is known to those skilled in the art. Use of a catalyst such as HCl generated by a chlorosilane endblocking agent is preferable when $R_3SiO_{\frac{1}{2}}$ endblocking units are present in polydiorganosiloxane (B) as noted earlier. Silazane endblocking agents can also be used when T is R— and are preferred when T in the polydiorganosiloxane (B) is H. Preferably, particularly when T in the polydiorganosiloxane (B) is HO—, an endblocking agent of the silazane type is used such that no extra catalyst needs to be added; the ammonia compound generated is generally volatile and can be eliminated more readily than a nonvolatile, solid catalyst material. When the resin copolymer (A) is prepared under acidic conditions as described in the Daudt, et al. patent above, there is often a sufficient level of acid catalyst present to enable endblocking units containing Y radicals of the alkoxy or —OH type to be used without any further addition of a condensation catalyst.

When necessary, an effective amount of an organic solvent can be added separately to the mixture of resin copolymer (A), polydiorganosiloxane (B), endblocking agent (C) and catalyst (D) to reduce the viscosity thereof or else can be present as a result of the fact that (A) and/or (B) was added as a solvent solution. The organic solvent should be inert towards the other components of the mixture and not react with them during the condensation step. As noted earlier, resin copolymer (A) is often made as a solvent solution in toluene or xylene. Use of an organic solvent is often necessary when polydiorganosiloxane (B) is in the form of a high viscosity gum which results in a high viscosity mixture even when the mixture is heated to typical processing temperatures of 100°–150° C. Use of an organic solvent which permits azeotropic removal of water is preferred. The term "organic solvent" includes a single solvent such as benzene, toluene, xylene, trichloroethylene, perchloroethylene, ketones, halogenated hydrocarbons such as dichlorodifluoromethane, naphtha mineral spirits and mixtures of two or more organic solvents to form a blended organic solvent. Use of a ketone such as methylisobutyl ketone as at least a portion of the solvent is preferred when fluorinated radicals are present on a major amount of the siloxane or silyl units present in polydiorganosiloxane (B) for compatibility reasons. Preferably, the mixture contains a hydrocarbon solvent selected from the group consisting of benzene, toluene and xylene.

In accordance with step (I) of the present invention, resin copolymer (A), polydiorganosiloxane (B), are mixed together with any organic solvent (E) that is to be added. While the condensation reaction may take place at room temperature if a suitably reactive silylating agent such as a silazane such as hexamethyldisilazane or a suitable catalyst such as tetramethylguanidine 2-ethylhexanoate is added and, optionally, with vacuum stripping of condensation by-products, the preferred method is to conduct the condensation reaction with heating and more preferably under solvent reflux conductions. Thus, the preferred method involves mixing (A), (B) and (E) until the mixture is uniform followed by the addition of endblocking agent (C) and any condensation catalyst (D) to be added. The mixture is stirred at room temperature for a short period of time to insure that all ingredients are dissolved.

The condensation step (II) is begun when addition of a suitably reactive endblocking agent such a silazane or a catalyst is made if the reaction is to take place at room temperature or else begins when the mixture is heated from 80° C. to 160° C., preferably to the reflux temperature of the mixture. Condensation is preferably allowed to proceed at least until the rate of evolution of condensation by-products such as water is substantially constant. Heating is then continued until the desired physical properties such as viscosity, tack and adhesion values are obtained. Typically the mixture is allowed to reflux for an additional 1 to 4 hours after the beginning of the evolution of condensation by-products. At that point, the rate of evolution of such by-products has usually become substantially constant. Longer reflux times may be needed for compositions containing organofunctional groups such as fluorinated radicals on the polydiorganosiloxane (B) and/or endblocking agent which are less compatible with those present on the copolymer (A). When the condensation reaction is complete, the residual endblocking agent is solvent stripped away by removing excess solvent during or after the azeotropic removal of condensation by-products. The nonvolatile solids content of the resulting silicone pressure-sensitive adhesive composition can be adjusted by adding or removing solvent, the solvent present can be completely removed and a different organic solvent added to the silicone pressure-sensitive adhesive product, the solvent can be removed completely if the condensation product is sufficiently low in viscosity or else the mixture can be recovered and used as is. Presently, it is preferred to have the pressure-sensitive adhesive compositions in organic solvent solution wherein the organic solvent comprises from 30 to 70 weight percent of the total mixture of (A), (B), (C), (D), and (E), particularly when the polydiorganosiloxane of (B) has a viscosity at 25° C. of greater than 100,000 centipoise.

The above procedure is preferred for compositions wherein the polydiorganosiloxanes (B) are greater than about 100,000 centipoise in viscosity at 25° C. When the viscosity of the polydiorganosiloxanes (B) are less than about 100,000 centipoise at 25° C., the physical properties of pressure-sensitive adhesives obtained therefrom are not always as high in tack and adhesion as may be desired and may also tend to result in adhesives possessing some adhesive transfer between substrates, see for example, the Pail Patent cited above.

For this reason, it is preferred that a precondensation step such as that employed in the Pail Patent be used in the process of the present invention prior to the condensation step in the presence of an endblocking agent (C) be used when a substantial amount of the polydiorganosiloxanes (B) have a viscosity of less than 100,000 centipoise at 25° C. In this case, Step (I) of the method of the present invention comprises the steps of (Ia) mixing resin copolymers (A), polydiorganosiloxanes (B) and any organic solvent (E) together in the presence of a silanol condensation catalyst of the type previously described, (Ib) condensing (A) and (B) to form a condensed product such as by heating under reflux conditions for 1 to 10 hours and (Ic) mixing the product of step (Ib) with (C), (D) and any further amount of organic solvent (E) which is necessary prior to proceeding with step (II) of the method of the present invention. The product of step (Ib) is thus increased in molecular weight by the precondensation step, but still contains residual silicon-bonded hydroxyl groups which are endblocked in accordance with the present method of the invention to result in an improved pressure sensitive adhesive composition. The resulting silicone pressure-sensitive adhesive composition is then processed according to Step (II) and the solvent can be adjusted as described above to obtain a finished silicone pressure-sensitive adhesive composition.

The silicone pressure-sensitive adhesive compositions of the present invention can be used to prepare pressure-sensitive adhesive films as is in accordance with well-known techniques or else can, optionally, be further cured to increase the cross-link density of the adhesive film to improve the physical properties of the film, particularly the ability of the adhesive to maintain a bond at high temperature such as 350° F. This is desirable where the adhesive is to be used in industrial applications where high tack (e.g., >400 g/cm$^2$) and adhesion (e.g., 1000 g/inch) values are needed. Uncured adhesives generally do not have cohesive strengths which are as high as those exhibited by cured adhesives. In accordance with well-known procedures, 0.5–3% by weight of a peroxide catalyst such as benzoyl peroxide or 2,4-dichlorobenzoyl peroxide based on adhesive solids can be added to the composition and the film can be cured at 110° C. to 200° C. for 1 to 10 minutes. Other free radical cross-linking methods such as electron beam or actinic radiation may be useful in curing adhesive films, particularly when the silicone pressure-sensitive adhesive contains aliphatically unsaturated radicals such as vinyl radicals, when the resin copolymer (A) and/or the endblocking triorganosilyl units of (C) of the silicone pressure-sensitive adhesive contain aliphatically unsaturated radicals such as vinyl radicals, the adhesive can be cured at room temperature or by heating by using an SiH bearing coreactant in conjunction with a chloroplatinic acid catalyst in the well-known manner.

Other well-known ingredients such as fillers or pigments may be added to the silicone pressure-sensitive adhesives of the present invention provided that such materials do not adversely affect the adhesive properties of the compositions. It is also anticipated that cold blends of two or more silicone pressure-sensitive adhesive compositions may be made to obtain compositions having intermediate properties. For example, up to about 30 weight percent of a modifier such as a silicone pressure-sensitive adhesive composition having 70–90 parts of resin copolymer (A) and 10–30 parts of polydiorganosiloxane (B) having a high adhesion value (e.g., >1300 g/inch) can be blended with 70–90 weight percent of a silicone pressure-sensitive adhesive composition of the present invention having 53 parts of resin copolymer (A) and 47 parts of polydiorganosiloxane (B) to improve the adhesion value of the silicone pressure-sensitive adhesive composition (all parts and percentages are by weight based on nonvolatile solids content). Although it is preferred that the modifier be made in accordance with the present invention, in some applications it may be possible to employ less than about 30 weight percent of silicone pressure-sensitive adhesive modifier containing some free silicon-bonded hydroxyl content, the less the better, without decreasing the stability of the silicone pressure-sensitive adhesives of the present invention to a large extent. The modifier need not be a pressure-sensitive adhesive and can comprise from 1 to 100 parts by weight of copolymer (A) and 0 to 99 parts by weight of polydiorganosiloxane (B).

Silicone pressure-sensitive adhesive compositions of the present invention can find use in applications where such adhesives have been used in the past such as in the manufacture of pressure-sensitive adhesive tapes, as pressure-sensitive adhesives for seaming fabrics and the like. When sufficiently compatible, they may be added to organic pressure-sensitive adhesives to change the properties of such adhesives. The stability of the adhesives of the present invention make them particularly desirable for use on tapes because the tack and adhesion properties remain reasonably constant with aging.

Another particularly useful application for the silicone pressure-sensitive compositions of the present invention is the subject of a U.S. patent application Ser. No. 665,803 to Virgil L. Metevia and John T. Woodard entitled "Transdermal Drug Delivery Devices with Amine-Resistant Silicone Adhesives" which is filed concurrently herewith and is assigned to the same assignee as is the present invention. That Metevia, et al. Application describes a transdermal drug delivery device for the controlled delivery of amino-functional drugs such as phenylpropanolamine. Silicone pressure-sensitive adhesives are very desirable for body contact use because they are permeable, moisture-resistant and are essentially hypoallergenic and non-irritating to the skin. Current silicone adhesives for such skin contact uses must possess low tack and adhesion value and contain silanol groups which are capable of being condensed by amines. As a result of contact with such drugs, the adhesive tends to dry out on storage and the adhesive will no longer adhere to the skin. Silicone pressure-sensitive adhesives made in accordance with the present invention are relatively insensitive to the effects of amines because a substantial proportion of the silicon-bonded hydroxyl radicals are endblocked and are very valuable as adhesives for such devices because of their stability towards the deleterious effects of amines on tack and adhesion values.

The following Examples are illustrative only and should not be construed as limiting the invention which is properly delineated in the appended claims. In the following Examples, all parts and percentages are by weight unless otherwise specified.

Quantitative tack measurements reported therein are performed through use of a POLYKEN TM brand Probe Tack Tester (Testing Machines, Inc., Amityville, N.Y.). Briefly summarized, tack measurements, expressed in units of grams/cm$^2$ of tack, were obtained using a probe velocity of 0.5 cm/sec., a contact pressure of 100 grams/cm$^2$, and contact time of 0.5 seconds. Quantitative adhesion measurements reported therein were obtained through use of a one inch wide aluminum or MYLAR ® tape which contained a 1.0 mil (or as reported in the Examples) layer of cured adhesive. The tape was adhered to a stainless steel panel and stripped at a rate of 12 inches/minute at an angle of 180°, with the results expressed in ounces (or grams) per inch. The adhesion test corresponds to ASTM D-1000.

Creep (high temperature lap shear stability) was determined according to Mil-T-81287, hereby incorporated by reference, wherein the pressure-sensitive adhesive is applied at a thickness of 1.5 mils (0.038 mm) to the full width of one inch wide strip of a 2 mil (0.05 mm) dead soft aluminum foil for a distance of greater than 1 inch (2.54 cm) from the end and the pressure-sensitive adhesive is cured. The strip having the cured pressure-sensitive adhesive film is adhered to a strip of stainless steel in such a manner that there is a one square inch (6.45 cm$^2$) contact of adhesive with the stainless steel strip and are adhered with a force of a rolled 10 lb (4.5 kg.) weight. The adhered strips are then fixed in a vertical orientation with the upper strip being secured and the lower strip bearing a 100 gram (g.) weight. The test is considered to be passed if less than a maximum slippage of ½ inch (1.27 cm) has occurred after heating the adhered strips over a 1 hour period to 500° F. and thereafter holding for 1 hour at 500° F.

Hold time was determined as follows. The pressure-sensitive adhesive was applied at a thickness of 1.5 mil (0.038 mm) to a one inch (25 mm) wide or a ¾ inch wide (19 mm) strip of MYLAR ® (a trademark of E. I. Du-Pont de Nemours It. Co., Wilmington, Del.) polyester film having a thickness of 1 mil (0.025 mm). After curing the pressure-sensitive adhesive, the strip was overlapped 1 inch (2.54 cm) on one end of a 1 inch (2.54 cm) wide stainless steel strip, pressed together with a 4.5 pound (2.0 kg) rolled weight and suspended vertically with the upper strip secured by its non-overlapped end and the lower strip bearing a 975 g. weight for a one inch width or a 750 g. weight for a ¾ inch strip at its nonoverlapped end. Hold time is the time elapsed before the strips part while being held in such a configuration in an oven at 350° F. The ¾ inch with one inch overlap with 750 g. weight provides essentially the same force per unit area as the one inch wide strip with one inch overlap with a 975 g. weight applied.

The nonvolatile solids content ("N.V.C.") of a material was determined by placing 1.5 g of the material in an aluminum foil dish, 60 mm in diameter and 15 mm deep, and heating the sample for 1 hour at 150° C. in an air-circulating oven. The heated sample was then cooled to room temperature and reweighed to determine the weight of the nonvolatile material (w). The N.V.C., in percent, is equal to 100* w/1.50. The N.V.C. of Resins A1 and A2 were determined by mixing 1.5 g. of the resin with 0.75 g. of a 100 centistoke viscosity trimethylsiloxy-endblocked polydimethylsiloxane fluid in a weighing dish and heating for 2 hours at 150° C. as described above to obtain the N.V.C.

The silicon-bonded hydroxyl content was determined using a lithium aluminum hydride di-N-butyl amide titration based upon the one described by Kellum, et al., and Chem. 39, 1623 ff (1967), see also Jorden, and Chem. 30, 297 (1964). The acid number was determined by titrating 1.00 g. of the material to a bromcresol purple endpoint using alcoholic KOH and is equal to the number of mg of KOH so used.

The viscosity of a material was determined at 25° C. with a Brookfield ® Viscometer Model LVF using the spindle and speed reported in the Examples. Unless otherwise specified, all parts and percentages reported are in parts by weight. The following ingredients were used in the Examples:

Resin A-1: A xylene solution of a resinous copolymeric siloxane prepared from 45 parts of sodium silicate (41.6° Be) and 20 parts of Me$_3$SiCl according to the method of the Daudt, et al. patent noted above containing Me$_3$SiO$_{\frac{1}{2}}$ units and SiO$_{4/2}$ units in a ratio of approximately 0.75:1.0, and N.V.C. typically about 69-71%, an acid number in the range of 0.3 to 1.4, and a viscosity in the range of 10-14 centipoise at 25° C. at 60% N.V.C. in xylene solution, and a silicon-bonded hydroxyl content of about 2.5 weight percent based on a 100% N.V.C. Several different batches of this copolymer were used in the following examples. Resin A-2: A resinous copolymeric siloxane which is the product obtained upon reacting Resin A-1 with a sufficient amount of hexamethyldisilazane to result in a resinous copolymeric siloxane having a silicon-bonded hydroxyl content of about 0.26% based upon 100% nonvolatile solds content. Resin A-2 had a nonvolatile solids content of about 60% in xylene.

Polydiorganosiloxane B-1 ("PDOS B-1"): A siloxane gum endblocked with silicon-bonded hydroxyl radicals having a viscosity of about 25,000,000 centipoise at 25° C. and a Williams Plasticity Value in the range of 54-60 mils (4.2 g. sample) at 90% N.V.C., silicon-bonded hydroxyl content of less than about 0.01% based on a 100% nonvolatile solids content. PDOS B-1 was prepared by reaction of 100 parts of a polydimethylsiloxane cyclic trimer with 0.40 parts of a hydroxy-endblocked polydimethylsiloxane fluid having a viscosity of 60-70 centistokes at 25° C. and 0.24 parts of a potassium silanolate catalyst.

Polydiorganosiloxane B-2 ("PDOS B-2"): A polydimethylsiloxane fluid endblocked with silicon-bonded hydroxyl radicals having a viscosity of about 12,000-15,000 centipoise at 25° C. and an N.V.C. minimum of at least 99%.

Examples 1-5 are comparative examples. In each of the following Examples 1-6, the weight ratio of copolymer resin to polydimethylsiloxane is 53:47.

EXAMPLE 1

This Example involves the production of a prior art silicone pressure-sensitive adhesive composition by mixing the following at room temperature:

374 g. of Resin A-1, 235 g. of PDOS B-1, 155 g. of xylene and 30 g. isopropanol (added as a viscosity stabilizer) and hereinafter referred to as "Example 1A". This composition had a silicon-bonded hydroxyl content of about 1.4%.

A second silicone pressure-sensitive adhesive composition was prepared using the same ingredients as for Example 1A, but further included 1.25 g. of a reaction product of 115 parts of tetramethylguanidine and 144 parts of 2-ethylhexanoic acid in 1036 parts of xylene (hereinafter "Catalyst 1"). That reaction product is a silanol condensation catalyst and generally has the effect of improving the tack and adhesion values of the pressure-sensitive adhesive film, but also causes an increase in solution viscosity upon aging. This catalyzed composition is referred to as "Example 1B".

EXAMPLE 2

In this Example, a resinous copolymer having a reduced silicon-bonded hydroxyl content was substituted for 50% of the higher hydroxyl content Resin A-1 used in Examples 1A and 1B on a nonvolatile solids content basis. Thus, Example 2A was a room temperature blend of the following: 187 g. Resin A-1, 217 g. Resin A-2, 125 g. xylene and 30 g. isopropanol. This composition had a silicon-bonded hydroxyl content of about 0.8%. Example 2B had the same formulation as Example 2A, but additionally contained 1.25 g. of Catalyst 1.

EXAMPLE 3

In this Example, a resinous copolymer having a reduced silicon-bonded hydroxyl content was substituted for all of the higher hydroxyl content Resin A-1 used in Examples 1A and 1B on a nonvolatile solids content basis. Thus, Example 3A was a room temperature blend of the following: 434 g. Resin A-2, 235 g. PDOS B-1, 95 g. xylene and 30 g. isopropanol. This composition had a silicon-bonded hydroxyl content of about 0.2%. Example 3B had the same formulation as Example 3A, but additionally contained 1.25 g. Catalyst 1.

EXAMPLE 4

A blend was prepared by mixing the following at room temperature: 1274 g. Resin A-1, 799 g. PDOS B-1 and 914 g. xylene. Then 911 g. of this blend was placed in a 3-necked flask equipped with a thermometer, a Dean-Stark trap fitted with a water-cooled condenser, a thermometer, and a drain stopcock at the bottom of the flask for sample removal and stirred until the blend was homogeneous. The blend in the flask was heated to reflux temperature (130° C.) over a 90 minute period at which time water began to collect in the Dean-Stark trap. Samples of the blend were withdrawn from the bottom stopcock at various intervals for room temperature viscosity aging studies and for tack and adhesive measurements at various time intervals. Variations in N.V.C. occurred due to the time needed to allow a sufficient amount of sample to drain through the stopcock. Using 0 min as the start of heating (flask contents at room temperature (25° C.)), samples were withdrawn at the intervals below and the water (condensation byproduct) collected, nonvolatile content, and silicon-bonded hydroxyl content was measured:

| Sample # | Time (min)[1]/ Temp (°C.) | Water (ml) | Viscosity[2]/ % N.V.C. | % SiOH[3] |
|---|---|---|---|---|
| 4-1 | 0/23 | 0 | 225/54.9 | 1.04 |
| 4-2 | 115-150/141 | 1.7 | 520/56.9 | 0.68 |
| 4-3 | 250/142 | 2.3 | 212/55.6 | 0.41 |

-continued

| Sample # | Time (min)[1]/ Temp (°C.) | Water (ml) | Viscosity[2]/ % N.V.C. | % SiOH[3] |
|---|---|---|---|---|
| 4-4 | 395/142 | 2.7 | 60/52.4 | 0.31 |

[1]Time at which the bottom sample stopcock was first opened until closing for sample withdrawal.
[2]Poise at 25° C., #4 spindle, speed = 6.
[3]Silicon-bonded hydroxyl content-total, based on 55% N.V.C.

After 395 minutes, the evolution of water was deemed to be substantially constant since 2.5 ml of water was collected at 325 minutes and 2.8 ml of water was collected at 455 minutes, the temperature of the refluxing mixture having stabilized at 142° C. during that entire period. The contents of the flask was cooled to room temperature and stored. During the heating, it was noted that the viscosity of the product reached a maximum and then began to decrease with increasing each time. The material in the flask was hazy until 250 minutes when it became clear and remained clear upon cooling.

EXAMPLE 5

In this Example, another 911 g aliquot of the blend prepared in Example 4 was placed in a flask or described in Example 4 and 10 g. of ammonium carbonate as a silanol condensation catalyst was added to the contents of the flask. The material in the flask was heated to 100° C. over a fifty minute period at which time water began to collect in the Dean-Stark trap. Samples of the material in the flask were withdrawn at various intervals for room temperature viscosity aging studies and for tack and adhesion measurements at various time intervals. As in Example 4, the following were measured:

| Sample # | Time (min)[1]/ Temp (°C.) | Water (ml) | Viscosity[2]/ % N.V.C. | % SiOH[3] |
|---|---|---|---|---|
| 5-1 | 0/23 | 0 | 336/54.9 | 1.04 |
| 5-2 | 90-100/138 | 3.6 | 370/53.8 | 0.59 |
| 5-3 | 155-175/143 | 5.4 | 303/53.6 | 0.61 |
| 5-4 | 280-290/143 | 5.5 | 149/54.7 | — |
| 5-5 | 400/143 | 5.6 | 109/55.6 | 0.51 |

[1]Time at which the bottom sample stopcock was first opened until closing for sample withdrawal.
[2]Poise at 25° C., #4 Spindle, Speed = 6
[3]Silicon-bonded hydroxyl content - total, based on 55% N.V.C.

With condensation catalyst, the reaction progressed rather rapidly and twice the amount of water was obtained as in Example 4. After about 235 minutes, the rate of evolution of water was substantially constant while the viscosity of the mixture began to drop with increasing cook time. The material in the flask was hazy until 90 minutes after the start of heating whereupon it became clear and stayed clear throughout the rest of the processing.

EXAMPLE 6

In this Example, a silicone pressure-sensitive adhesive composition was prepared in accordance with the method of the present invention. 375 g. Resin A-1, 235 g PDOS B-1 and 330 g xylene were charged to a flask as in Example 4. When the mixture was homogeneous, a sample was withdrawn for testing (sample #6-0) and then 60 g (Me$_3$Si)$_2$NH (hexamethyldisilazane) was added. That amount of hexamethyldisilazane was about 190% of the calculated stoichiometric amount needed to react with the silicon-bonded hydroxyl radicals present in Resin A-1 and PDOS B-1. The cloudy mixture in the flask became clear upon addition of the hexamethyldisilazane. Using 0 minutes as the start of heating after the addition of the hexamethyldisilazane (sample #6-1), samples were withdrawn as in Example 4 at various intervals. The materials in the flask turned clear after 40 minutes at 75° C. and evolution of water was noted after 85 minutes at 126° C. The material obtained at the end of the procedure was clear. The following describes the measurements made during the processing. The silicon-bonded hydroxyl content of the product was not measured.

| Sample # | Time (min)[1]/ Temp (°C.) | Water (ml) | Viscosity[2]/ % N.V.C. |
|---|---|---|---|
| 6-0 | —/25 | — | 690/57.3 |
| 6-1 | 0/27 | 0 | 265/50.7 |
| 6-2 | 130–210/137 | 1.0 | 760/58.5 |
| 6-3 | 340–350/138 | 1.2 | 120/49.5 |
| 6-4 | 408–413/138 | 1.2 | 70/48.7 |
| 6-5 | 460/140 | 1.2 | 180/54.6[3] |

[1]Time at which the bottom sample stopcock was first opened until closing for sample withdrawal.
[2]Poise at 25° C., #4 spindle, speed = 6
[3]60 ml of xylene was stripped out in 20 ml increments at 413 min, 445 minutes and 460 minutes to remove any residual endblocking agent from the product resulting in an increase in N.V.C.

EXAMPLE 7

In this Example, a silicone pressure-sensitive adhesive of the present invention was prepared similar to the procedure used in Example 6, but containing a higher ratio of Resin A-1 to PDOS B-1 (57 parts Resin A-1: 43 parts PDOS B-1) than in Example 6. Thus, 440 g Resin A-1, 235 g PDOS B-1 and 446 g xylene were charged to a flask as in Example 4 and stirred until all ingredients were homogeneously blended. At that time, 60 g hexamethyldisilazane (about 160% of the stoichiometric amount) was added and the mixture was stirred 15 minutes at 25° C. The formerly cloudy mixture had turned clear. Heating of the contents of the flask was begun (time=0 minutes) and the material in the flask was cloudy after 55 minutes at a temperature of 87° C. Water evolution began to occur after 70 minutes at a temperature of 113° C. The material in the flask became clear after about 415 minutes. The following measurements were made during the processing:

| Sample # | Time (min)[1]/ Temp (°C.) | Water (ml) | Viscosity[2]/ % N.V.C. |
|---|---|---|---|
| 7-1 | 0–40/28–58 | — | 198[2]/49.5 |
| 7-2 | 60–70/93–113 | Trace | 291[2]/52.7 |
| 7-3 | 115–235/137–138 | 1.0–1.2 | 3320[3]/68.6 |
| 7-4 | 355–415/138 | 1.3 | 882[4]/66.2 |
| 7-5 | 435/138 | 1.3 | 117[2]/50.5 |

[1]Time at which the bottom sample stopcock was first opened until closing for sample withdrawal.
[2]Poise at 25° C., #4 spindle, speed = 6
[3]Poise at 25° C., #4 spindle, speed - 1.5
[4]Poise at 25° C., #4 spindle, speed = 3

The viscosity of the material in the flask became rather high which affected the time needed to withdraw sufficient sample and due to solvent evaporation, rather high solids content materials were obtained having high viscosities. The evolution of water had become substantially constant after 235 minutes.

EXAMPLE 8

In this Example, the results of room temperature viscosity aging on the materials prepared in Examples 1–7 are described. Table I lists the results of room temperature aging studies. A hyphen in this and the other tables means the property was not measured. The samples of pressure-sensitive adhesive composition were stored at room temperature (23°±2° C.) for the periods shown (Init=initial, D=days, W=weeks, MO=-months for this and the following Examples) in Table I.

Examples 1A, 1B, 4-1 and 6-0 were unheated, cold blends which exhibited a typical undesirable substantial increase in viscosity with time. Several of the materials exhibited undesirable phase separation into two different phases. The use of a silanol condensation catalyst in Example 1B appears to accelerate viscosity increases with aging. Examples 2A and 2B still exhibited substantial increases in viscosity even though one-half of the resin copolymer employed had a reduced silicon-bonded hydroxyl content. In the absence of a silanol condensation catalyst, Example 3A exhibited a substantial increase in viscosity after 12 months even though all of the resin copolymer had a reduced silicon-bonded hydroxyl content. Example 3B increased in viscosity with time in the same manner as did Example 3A, but did not substantially increase in viscosity between the 3 month and 12 month intervals that the viscosity was measured.

In Examples 4-1 through 4-4, heating in the absence of a catalyst produced pressure-sensitive adhesive compositions which substantially increased in viscosity upon aging regardless of the amount of time the material was processed. Phase separation was observed for Examples 4-1, 4-3 and 4-4.

Use of heating in the presence of a silanol condensation catalyst while the pressure-sensitive adhesive was being processed resulted in adhesive compositions which were more stable upon aging than those of Example 4, but a substantial increase in viscosity upon aging was still observed even for Example 5-5 which more than doubled in viscosity after 11 months of aging time.

Examples 6 and 7 illustrate the one advantage of silicone pressure-sensitive adhesives of the present invention. The presence of triorganosilyl endblocking units in the process permits such units to react with free silicon-bonded hydroxyl radicals to limit the rise in viscosity observed upon aging. Some endblocking takes place within a short time after the addition of the endblocking agent which, in this case, is hexamethyldisilazane. This is shown by comparing Example 6-0 with Example 6-1 where Example 6-0 contained no endblocking agent while Example 6-1 was sampled 15 minutes after the hexamethyldisilazane was added. The temperature of the materials in the flask rose from 25° C. to 27° C. within 15 minutes after the addition of the hexamethyldisilazane indicating that a reaction was taking place. Example 6-0 exhibited a 310% increase in viscosity after 11 months while Example 6-1 only increased by 166% over the same period. The remaining Examples 6-2, 6-3, 6-4 and 6-5 showed lower increases in viscosity upon aging than Example 6-1 for the time periods measured, particularly Examples 6-2 and 6-5 which were also checked after 10 months. No phase separations were observed. Only Example 3B exhibited such viscosity stability, but the addition of a silanol condensation catalyst to a room temperature blend fails to offer the versatility in terms of types of endblocking units and alterations in viscosity and tack/adhesion properties offered by the present invention. Another advantage of the present invention is that the viscosity of the pressure-sensitive adhesive product can be varied by the processing time used with only minor effects on the tack and adhesion properties of the resulting adhesive as will be discussed in the next Example.

The foregoing formulations all contained the same ratio of Resin A-1 to PDOS B-1 (53:47). Example 7 employed a higher ratio of Resin A-1 to PDOS B-1 (57:43). With the exception of Example 7-3 where difficulty was experienced in withdrawing a sample from the flask due to the viscosity of the mixture (about 2 hours were needed to withdraw a sample), the remaining Examples 7-1, 7-2, 7-4 and 7-5 exhibited viscosity stabilities comparable to that of Example 6. No phase separation was observed in any of the materials produced in Example 7.

were not covered with release paper) in covered areas at room temperature for the times stated in Table II.

It was observed that in the examples prepared with heating, processing time had an effect on the adhesion values while the effect of processing time on tack values was less pronounced. Generally, the adhesion values reported in all of the Examples have an accuracy of about $\pm 2$ oz/in. and tack values are about $\pm 50$ g.

In the absence of a condensation catalyst, the adhesion values obtained with Examples 1A, 2A and 3A were rather low as was Example 6-0 although 100% transfer occurred initially, but was not observed after 14 days and 7 weeks.

Addition of a condensation catalyst in Examples 1B, 2B and 3B improved the initial adhesion values and, except for Example 3B, the tack values as well.

TABLE I

| Ex. # | NVC | VISCOSITY (Poise, #4 Spindle, speed = 6) | | | | | |
|---|---|---|---|---|---|---|---|
| | | INIT./1D | 3D/7D | 10D/2W | 4W/7W | 10W/3MO | 10MO/11MO |
| 1A | 60.5 | 1480/1460 | —/1190* | —/1144 | 1148/— | —/2100 | —/3960*[4] |
| 1B | 60.6 | 1370/1390 | —/1338 | —/1360 | 1466/— | —/1860 | —/4800[4] |
| 2A | 61.2 | 1382/1220 | —/1300 | —/1280 | 1412/— | —/2000 | —/5900*[4] |
| 2B | 60.0 | 1040/1060 | —/1246 | —/1400 | 1590/— | —/2136 | —/3500[4] |
| 3A | 61.3 | 840/840 | —/890 | —/930 | 1000/— | —/1400 | —/3000[4] |
| 3B | 62.0 | 820/820 | —/886 | —/926 | 1000/— | —/1220 | —/1260[4] |
| 4-1 | — | 336/— | —/377 | —/441 | 558/— | —/730 | —/1510* |
| 4-2[1] | 56.9 | 520/— | —/628 | —/— | 709/— | 855/— | —/1560 |
| 4-3 | 55.6 | 212/— | —/240 | —/— | 262/— | 300*/— | —/580* |
| 4-4 | 52.4 | 60/— | —/64 | —/— | 65*/— | 92*/— | —/220* |
| 5-1 | 54.9 | 336/— | —/— | —/— | —/— | —/— | —/— |
| 5-2 | 53.8 | 370/— | —/450 | —/— | 665/— | 795/— | —/1236 |
| 5-3 | 53.6 | 303/— | —/351 | —/— | 406/— | 480/— | —/740 |
| 5-4 | 54.9 | 149/— | —/170 | —/— | 196/— | 221/— | —/384 |
| 5-5 | 55.6 | 109/— | —/122 | —/— | 170/— | 185/— | —/244 |
| 6-0 | 57.2 | 690/— | 735/— | 706/— | —/985 | —/— | 2140/— |
| 6-1 | 50.7 | 265/— | 265/— | 257/— | —/258 | —/— | 440/— |
| 6-2 | 58.5 | 760/— | 820/— | 890/— | —/1380 | —/— | 1220/— |
| 6-3 | 49.5 | 120/— | 140/— | 148/— | —/173 | —/— | —/— |
| 6-4 | 48.7 | 70/— | 80/— | 82/— | —/— | —/— | —/— |
| 6-5 | 54.6 | 180/— | 190/— | 177/— | —/213 | —/— | 260/— |
| 7-1 | 49.5 | 198/— | 210/— | —/— | —/183[2] | —/— | 220/— |
| 7-2 | 52.7 | 291/— | 356/— | —/— | —/385[2] | —/— | 413/— |
| 7-3[3] | 68.6 | 3328/— | —/— | —/— | —/4360[2] | —/— | 2840/— |
| 7-4[3] | 66.2 | 916/— | 1111/— | —/— | —/1510[2] | —/— | 1640/— |
| 7-5 | 50.5 | 117/— | 119/— | —/— | —/1133[2] | —/— | 170/— |

*Phase separation occured
[1]Speed = 3 for viscosity measurements
[2]Six weeks aging time
[3]Speed = 1.5 for viscosity
[4]12 month aging time

EXAMPLE 9

In this Example, the results of the effect of room temperature aging on tack and adhesion values on the materials prepared in Examples 1-7 are described. Table II lists the results obtained when the tack and adhesion of films prepared from those samples (heat cured with 1% by weight benzoyl peroxide based on 100% N.V.C.) were tested at various intervals of time. The tack and adhesion values of Examples 5-1 and 7-3 were not studied. Aging studies on Examples 1-4 and and 6-0 were not done since they were included to study their viscosity stability. The initial tack and adhesion values of Examples 1-4 and 6-0 were measured and are reported in Table II.

The studies were done by drawing out a film of the silicone pressure-sensitive adhesive composition on a large (6 inch by 12 inch) MYLAR® polyester substrate so that several tack and adhesion measurements could be made from different sections of the same film. Films made with Examples 1-7 were cured for 15 minutes at 70° C. followed by 5 minutes at 150° C. The samples were stored exposed to the atmosphere (they In the heat-processed materials, the initial adhesion values obtained for Example 4 were about the same regardless of heating time, but the adhesion values dropped with aging. The initial tack values ranged between 487 to 580 g/cm$^2$, but decreased significantly upon aging after only 3 weeks.

In the materials processed with heating in the presence of a silanol condensation catalyst (Example 5), the initial adhesion values were typically higher than those obtained in Example 4 and decreased with aging at a slower rate. Initial tack values for Example 5 were likewise higher than for Example 4, but decreased significantly after 9 weeks aging.

Examples 6 and 7 show the versatility of the method of the present invention and the effect of processing time on physical properties of the adhesive film. Longer processing time tended to reduce the adhesion values after the adhesion values reached a maximum (similar to the viscosities obtained which initially increased and then decreased) and a similar trend was seen for the tack values. Longer processing times tended to cause the values to decrease with time (e.g., Example 6-4). Example 6-1 was quite stable in both viscosity and adhesion/- with Example 6-4 which was processed longer than Example 6-3.

TABLE II

| Ex. # | Film[2] | ADHESION (oz/in)[1] | | | | TACK (g./cm²)[1] | | | |
|---|---|---|---|---|---|---|---|---|---|
| | | Init./7D | 10D/14D | 3W/6W | 7W/9W | Init./7D | 10D/14D | 3W/6W | 7W/9W |
| 1A | 1.0 | 22/— | —/— | —/— | —/— | 220/— | —/— | —/— | —/— |
| 1B | 2.0 | 38/— | —/— | —/— | —/— | 547/— | —/— | —/— | —/— |
| 2A | 1.0 | 22/— | —/— | —/— | —/— | 397/— | —/— | —/— | —/— |
| 2B | 1.9 | 33/— | —/— | —/— | —/— | 497/— | —/— | —/— | —/— |
| 3A | 1.1 | 22/— | —/— | —/— | —/— | 500/— | —/— | —/— | —/— |
| 3B | 1.9 | 41/— | —/— | —/— | —/— | 407/— | —/— | —/— | —/— |
| 4-1 | 2.4 | 38/33 | —/— | 35/— | —/— | 560/300 | —/— | 340/— | —/— |
| 4-2 | 2.2 | 41/35 | —/— | 28/— | —/— | 520/467 | —/— | 400/— | —/— |
| 4-3 | 2.3 | 43/37 | —/— | 32/— | —/— | 487/463 | —/— | 427/— | —/— |
| 4-4 | 2.0 | 42/49 | —/— | 35/— | —/— | 580/515 | —/— | 380/— | —/— |
| 5-2 | 2.0 | 41/— | —/— | 39/— | —/— | 560/— | —/— | 510/— | —/— |
| 5-3 | 2.1 | 43/42 | —/— | 42/— | —/— | 600/578 | —/— | 533/— | —/— |
| 5-4 | 2.2 | 42/46 | —/— | 44/— | —/40 | 603/590 | —/— | 515/— | —/380 |
| 5-5 | 2.3 | 48/46 | —/— | 41/— | —/39 | 610/600 | —/— | 570/— | —/340 |
| 6-0 | 3 | 28/— | —/— | —/— | —/— | 520/— | —/— | —/— | —/— |
| 6-1 | 3 | 56[4]/— | —/56 | —/— | 47/— | 680/— | —/647 | —/— | 640/— |
| 6-2 | 3 | 46/— | —/42 | —/— | 46/— | 783/— | —/633 | —/— | 540/— |
| 6-3 | 3 | 39/— | —/39 | —/— | 36/— | 620/— | —/560 | —/— | 540/— |
| 6-4 | 3 | 32/— | —/32 | —/— | 28/— | 490/— | —/403 | —/— | 240/— |
| 6-5 | 3 | 49[4]/— | —/53 | —/— | —/— | 607/— | —/640 | —/— | —/— |
| 7-1 | 1.5 | 35/— | 41/— | —/45 | —/— | 630/— | 450/— | —/240 | —/— |
| 7-2 | 1.8 | 41/— | 46/— | —/— | —/— | 523/— | 413/— | —/170 | —/— |
| 7-4 | 1.7 | 46/— | 46/— | —/— | —/— | 565/— | 477/— | —/— | —/— |
| 7-5 | 1.5 | 42/— | 42/— | —/45 | —/— | 383/— | 217/— | —/210 | —/— |

[1] 1% benzoyl peroxide curing catalyst added based on 100% N.V.C.
[2] Film thickness in mils (1 mil = 0.001 inch)
[3] Film thickness not measured, nominal 1.5 mils assumed
[4] 100% transfer occurred.

tack values. Likewise, Examples 6-2 and 6-3 were quite stable while the tack and adhesion values of Example 6-4 showed a small decrease in adhesion and a significant decrease in tack with aging. Example 6-5 was fairly stable over the two week period of testing. Based on this and subsequent work, a processing time of no more than about 1-5 hours after the start of water evolution was deemed to be preferable to produce compositions of the present invention.

Example 7 employed less hexamethyldisilazane than did Example 6 since 4 additional parts of the higher silicon-bonded hydroxyl content Resin A-1 was employed. The ratio of silicon-bonded hydroxyl units to trimethylsilyl units in this Example was 1.0:1.7. While the viscosity stability of this pressure-sensitive adhesive was rather good and the adhesion values were relatively stable and, in several cases, increased with aging, the tack values were observed to decrease with time much more than was obtained with Example 6.

The tack and adhesion values upon aging of Examples 6-0, 6-3, 6-4, 7-1 and 7-5 were evaluated with no benzoyl peroxide curing catalyst added. The results were as follows where adhesion is in ounces/inch and tack is in grams:

Example 6-0—adhesion: initial—28/14 days—56; and tack: initial—520/14 days—420. Example 6-3—adhesion: initial—37 (30% transfer)/7 weeks—32 and tack: initial—628/7 weeks—500. Example 6-4—adhesion: initial—63 (100% transfer)/14 days-56 (100% transfer)/7 weeks—68. Example 7-1 (film thickness=2.2 mil)—adhesion: initial—56/10 days—35 (75% transfer) and tack: initial—603/10 days—507. Example 7-5 (film thickness=2.0 mils)—adhesion: initial—35 (100% transfer)/10 days—35 (100% transfer)/6 weeks—32 (100% transfer). As with the benzoyl peroxide cured samples, the adhesives of Example 6 were more stable towards aging than those of Example 7. More transfer occurred

EXAMPLE 10

In this example, several different pressure-sensitive adhesive compositions were prepared with varying levels of hexamethyldisilazane endblocking agent, different ratios of Resin A-1 to PDOS B-1 and different processing times to show the effect of such changes on viscosity and adhesive properties. In the previous Examples, the PDOS B-1 was assumed to contain 100% N.V.C. when formulating the Resin A-1 (70.7% N.V.C.) to PDOS B-1 ratios. Since there were some low molecular weight species such as cyclic polydimethylsiloxanes and silicon-bonded hydroxyl endblocked polydimethylsiloxanes present, the N.V.C. of the PDOS B-1 was measured and found to be 92.3% for the batch of PDOS B-1 used in these Examples. That N.V.C. was used in determining the Resin A-1 to PDOS B-1 ratios in this series of Examples.

In Examples 10A, 10B and 10C, 10A was made using one half of the amount of hexamethyldisilazane used in 10B and 10C was made using 75% of the amount of hexamethyldisilazane as in Example 10B. Examples 10A and 10B were processed for 3 hours and Example 10C was processed for 2 hours (i.e., for 2½ and 1½ hours, respectively, after evolution of condensation by-product began. The Resin A-1 to PDOS B-1 ratio was 50 parts of Resin A-1 and 50 parts of PDOS B-1.

In Example 10A, 942.5 g Resin A-1, 720 g PDOS B-1 and 757.5 g xylene were mixed in a flask as in Example 4. When well mixed (temperature was 24° C.), 80 g hexamethyldisilazane (about 100% of the stoichiometric amount) was added at time 0 and the mixture had reached 32° C. after 5 minutes at which time the heat was turned on. After 28 minutes, water was observed to be evolving at 90° C. The temperature was 135° C. after 95 minutes at which time 4.0 ml of condensation by-product (water) was collected. The heat was turned off after 185 minutes at which time the temperature was 136° C. and a total of 4.5 ml of condensation by-product was collected. The silicone pressure-sensitive adhesive product in the flask was cooled to room temperature, had an N.V.C. of 59.6% and was hazy. The haziness or turbidity of the products of this Example was visually estimated on a scale of 0 to 10 where 0 was very hazy, almost opaque and 10 was water clear. The turbidity of Example 10A was 0.

In Example 10B, the formulation used was 915 g Resin A-1, 697.5 g PDOS B-1, 732.5 g xylene and 155 g hexamethyldisilazane (about 200% of the stoichiometric amount). The processing was as in Example 10A: heat on at 28° C. (0 minutes), condensation by-product evolution begun at 120° C. at 30 minutes, the temperature had reached 136° C. after 64 minutes and the heat was turned off after 240 minutes (temperature was 138° C.) when a total of 4.5 ml condensation by-product had been collected. The N.V.C. was 53.0% and the turbidity was 10 (water clear) at room temperature.

In Example 10C, the formulation was 927.5 g Resin A-1, 707.5 g PDOS B-1, 745 g xylene and 120 g hexamethyldisilazane (about 150% of the stoichiometric amount). It was processed as in Example 10A: heat on at 28° C. (0 minutes), by-product evolution began after 30 minutes at 115° C., the temperature was 140° C. after 64 minutes and the heat was turned off after 120 minutes (temperature was 140° C.) when a total of 1.5 ml condensation by-product was collected. The N.V.C. was 52.1% and the turbidity was 10 (water clear) at room temperature.

In the following Examples 10D, 10E and 10F, the formulation contained 56 parts of Resin A-1 and 44 parts of PDOS B-1. Examples 10D and 10E had the same formulation, but Example 10E was processed 2 hours longer than Example 10D. Example 10F contained 33% more hexamethyldisilazane than Examples 10D and 10E and was processed for a total of 3 hours. (2½ hours after the evolution of condensation by-product began).

In Example 10D, the formulation used was 1037.5 g Resin A-1, 622.5 g PDOS B-1, 720 g xylene and 120 g hexamethyldisilazane (about 140% of the stoichiometric amount). It was processed as in Example 10A: heat on at 25° C. (0 minutes), stirrer shaft broke at 11 minutes (temperature 26° C.) and was changed, heating resumed at 49 minutes (temperature was 26° C.), condensation by-product evolution began after 101 minutes (temperature was 88° C.) and the heat was turned off after 176 minutes (temperature was 135° C.) when a total of 4.0 ml condensation by-product was collected. The N.V.C. was 53.4% and the turbidity was 10 (water clear) at room temperature.

In Example 10E, the same formulation was used as in Example 10D. It was processed as in Example 10A: heat on at 27° C. (0 minutes), by-product evolution began at 100° C. after 32 minutes, 4.0 ml condensation by-product was collected after 163 minutes (temperature was 135° C.) and the heat was turned off after 240 minutes (temperature was 136° C.) when a total of 4.0 ml condensation by-product was collected. The N.V.C. was 55.5% and the turbidity was 10 (water clear) at room temperature.

In Example 10F, the formulation was 1017.5 g Resin A-1, 615 g PDOS B-1, 710 g xylene and 157.5 g hexamethyldisilazane (about 180% of the stoichiometric amount). It was processed as in Example 10A: heat on at 30° C. (0 minutes), by-product evolution began at 104° C. after 30 minutes, the temperature was 138° C. after 64 minutes and the heat was turned off after 180 minutes (temperature was 138° C.) when a total of 1.5 ml condensation by-product was collected. The N.V.C. was 50.6% and the turbidity was 10 (water clear) at room temperature.

In the foregoing Examples 10A–10F., no solvent stripping was done to remove residual unreacted endblocking agent or reaction products thereof such as hexamethyldisiloxane and any remaining ammonia or water not collected as a condensation by-product. In Example 10G, the more preferred procedure of stripping an amount of xylene from the material in the flask was used to remove such by-products. In Example 10G, the formulation was 1100 g Resin A-1, 614.5 g PDOS B-1, 695 g xylene and 87.5 g hexamethyldisilazane. It was processed as in Example 10A: heat on at 30° C. (0 minutes), after 134 minutes (temperature was 136° C.) a total of 4.5 ml condensation by-product was collected and solvent stripping was begun. After 168 minutes at a temperature of 144° C., 616.6 g of volatile material was removed through the Dean-Stark trap and the heat was turned off. The stripped product had an N.V.C. of about 75%.

The viscosity stability of Example 10G was evaluated by an accelerated aging process involving storing a sample of the composition in a sealed bottle in a 60° C. oven for 14 days. The viscosity (Spindle #4, speed=6) was measured at room temperature after 7 and 14 days. The results were: initial viscosity 183,000 centipoise; 7 days—180,000 centipoise and 14 days 181,000 centipoise. The viscosity stability of this composition was excellent based on these results. This is surprising in view of the relatively high N.V.C. and initial viscosity of the composition.

Table III lists the initial viscosities of the foregoing Examples along with the initial tack and adhesion properties for films of each. The tack and adhesion properties were measured at room temperature on films which were drawn out on a MYLAR ® polyester substrate. The measurements were made after the films were left at room temperature for 15 minutes followed by 5 minutes at 150° C. in an air circulating oven.

Doubling the level of endblocking units in Example 10A resulted in Example 10B with higher tack and adhesion values than Example 10A although some transfer occurred in Examples 10B. Use of a shorter processing time and an intermediate (between 10A and 10B) level of endblocking agent resulted in Example 10C which was higher in viscosity than Example 10B, similar in tack and lower in adhesion than 10B. By doubling the processing time, Example 10E was lower in viscosity than Example 10D and had a higher tack value but was lower in adhesion (100% transfer occurred). Use of more endblocking agent and a cook time between that of 10D and 10E resulted in Example 10F which was higher in viscosity than 10D and 10E, had a higher tack value than 10D and was lower in adhesion than 10D and 10E, but exhibited very little transfer from the polyester substrate to the stainless steel panel during adhesion testing.

Example 10G had the highest viscosity and tack value of this series of Examples along with a relatively high adhesion value for an uncured film of adhesive.

TABLE III

| Ex. # | Init. Visc.[1] | N.V.C. | Resin A-1/ PDOS B-1 | Process Time (hrs) | Me₃Si—:—SiOH | Tack (g/cm²) | Adhesion[2] | Film (mil) |
|---|---|---|---|---|---|---|---|---|
| 10A | 690 | 59.6 | 50/50 | 3 | 1.0:1 | 472 | 42(1200) | 1.9 |
| 10B | 100 | 52.1 | 50/50 | 3 | 2.0:1 | 537 | 56(1600)[3] | 1.5 |
| 10C | 400 | 53.0 | 50/50 | 2 | 1.5:1 | 527 | 47(1330) | 1.6 |
| 10D | 335 | 53.4 | 56/44 | 2 | 1.4:1 | 436 | 44(1250) | 1.3 |
| 10E | 250 | 55.5 | 56/44 | 4 | 1.4:1 | 640 | 32(910)[4] | 1.3 |
| 10F | 390 | 50.6 | 56/44 | 3 | 1.8:1 | 500 | 39(1300)[5] | 2.0 |
| 10G | 1830 | 75 | 57/43 | 3 | 0.9:1 | 710 | 53(1500) | 1.8 |

[1]Poise at 25° C., spindle #4, speed = 6.
[2]First number is oz/inch, second is g/inch.
[3]50% transfer occurred.
[4]100% transfer occurred.
[5]5% transfer occurred.

EXAMPLE 11

In this Example, compositions of the present invention were used to prepare pressure-sensitive adhesive tapes and the tapes were aged in roll form at room temperature and at 60° C. to evaluate the effect of aging on the tack and adhesion values of the pressure-sensitive adhesive tapes.

Example 11A which contained 58 parts of Resin A-1 and 42 parts of PDOS B-1 was prepared in accordance with the present invention using 80% of the stoichiometric amount of hexamethyldisilazane (5.5 parts hexamethyldisilazane per 100 parts Resin A-1 and PDOS B-1 on a 100% N.V.C. basis) as an endblocking agent to result in a water clear composition having an N.V.C. of about 55% in xylene solvent. Solvent stripping at the end of processing to remove by-products was used. Example 11B which contained 53 parts of Resin A-1 and 47 parts of PDOS B-1 was prepared in the manner described for Example 10B using 87% of the stoichiometric amount of hexamethyldisilazane to result in a water clear composition having an N.V.C. of about 55% in xylene solvent. Example 11C which contained 45 parts of Resin A-1 and 55 parts of PDOS B-1 was prepared in the manner described for Example 11A using 103% of the stoichiometric amount of hexamethyldisilazane to result in a water clear composition having an N.V.C. of about 55% in xylene solvent. Example 11D was a comparative example run using a commercially obtained sample of silicone pressure-sensitive adhesive sold under the name "GE 518" by the General Electric Company, Waterford, N.Y., which was believed to contain a resin copolymer containing Me₃SiO₁ and SiO₄/₂ units along with a polydimethylsiloxane polymer which also contained about 2–3% of Ph₂SiO units having an N.V.C. of about 55% in toluene solvent. The manner in which this adhesive composition was produced was not readily ascertainable nor was such information available from the manufacturer. Comparative Example 11E was a silicone pressure-sensitive adhesive composition of the type described in Example 1B.

The tapes were made by coating each of the adhesive compositions (containing 2% or 3% benzoyl peroxide curing catalyst based on 100% N.V.C. of the adhesive) on a 1 mil thickness 14 inches wide of MYLAR ® polyester, curing each composition to form a nominal 1.5 mil pressure-sensitive adhesive film using a cure step of 2.5 minutes at 180° F. followed by 2.5 minutes at 340° F. and thereafter rolling the coated tape to form a roll of tape which was stored for evaluation in two ways. One set of rolls of tape were stored at room temperature for 4 weeks and the tack and adhesion values were measured using tape from each roll initially and at 2 week intervals thereafter. The other rolls of tape were stored at 60° C. and tack and adhesion values of the adhesive tape were measured at room temperature at weekly intervals of time over a 4 week period. Samples of the tapes were also separately evaluated for hold time.

The results of the room temperature aging testing are reported in Table IV. The results of the 60° C. aging are reported in Table V. The results show that the tack and adhesion values of silicone pressure-sensitive adhesives of the present invention are quite stable upon aging, particularly upon accelerated aging testing at elevated temperatures. Example 11D was also quite stable. Example 11E had good tack and adhesion properties, but was not good in viscosity stability upon aging. Example 11D was comparable to Examples 11A–11C in viscosity stability upon aging.

Examples 11A–11C were deficient in hold time relative to Examples 11D and 11E.

In Table V, hold time #1 was data obtained from an independent evaluator. Hold time #2 was obtained in our laboratories. The discrepancy is unexplained, but may be due to the manner in which the samples were prepared, oven temperature differences or the like. It is known, for example, that inadvertent hand pressure can increase the effective weight of the rolled weight used in pressing samples together for test and can affect test results.

TABLE IV

| EX. # | % B.P.[1] | Tack (g/cm²)[2] | | | Adhesion (g/inch)[2] | | |
|---|---|---|---|---|---|---|---|
| | | Init. | 2W | 4W | Init. | 2W | 4W |
| 11A | 2 | 650[3] | — | 370 | 1040 | — | 970 |
| 11A | 3 | 500 | 430 | — | 1080 | 930 | — |
| 11B | 2 | 660 | — | 620 | 1040 | — | 1090 |
| 11B | 3 | 600 | 580 | — | 1140 | 970 | — |
| 11C | 2 | 470 | — | 470 | 650 | — | 650 |
| 11C | 3 | 460 | 460 | — | 610 | 600 | — |
| 11D | 2 | 370 | — | 310 | 810 | — | 700 |
| 11E | 2 | 430 | 480 | — | 840 | 820 | — |

[1]% benzoyl peroxide based on 100% N.V.C. of adhesive composition.
[2]Init. = initial, W = Weeks, stored at room temperature (23 ± 2° C.).
[3]May be erroneous in view of subsequent values.

TABLE V

| EX. # | % B.P.[1] | Tack (g/cm²)[2] | | | | | Adhesion (g/inch)[2] | | | | | Hold Time #1 (Hrs.) | Hold Time #2 (Hrs.) |
|---|---|---|---|---|---|---|---|---|---|---|---|---|---|
|   |   | Init. | 1W | 2W | 3W | 4W | Init. | 1W | 2W | 3W | 4W |   |   |
| 11A | 2 | 650[3] | 450 | 420 | 470 | 480 | 1040 | 1000 | 1040 | 930 | 1060 | 10 | 80+ |
| 11A | 3 | 500 | 445 | 490 | — | — | 1080 | 1100 | 1070 | — | — | 3 | — |
| 11B | 2 | 660 | 595 | 630 | 560 | 560 | 1050 | 1130 | 1140 | 1170 | 960 | 4 | 7-23[4] |
| 11B | 3 | 600 | 600 | 660 | — | — | 1140 | 1050 | 1060 | — | — | 6 | — |
| 11C | 2 | 470 | 520 | 560 | 480 | 520 | 650 | 690 | 665 | 680 | 500 | 5 | 30 |
| 11C | 3 | 460 | 440 | 480 | — | — | 610 | 650 | 620 | — | — | 12 | — |
| 11D | 2 | 430 | 430 | 470 | — | — | 840 | 930 | 900 | — | — | 120+ | 30+ |
| 11E | 2 | 370 | 410 | 410 | 330 | 380 | 810 | 800 | 930 | 840 | 770 | 120+ | — |

[1]% benzoyl peroxide based on 100% N.V.C. of adhesive composition.
[2]Init. = initial, W = Weeks, stored at 60° C.
[3]May be erroneous in view of subsequent values.
[4]Failed between 7 and 23 hours

EXAMPLE 12

In view of the low hold time observed in Examples 11A-11C, an attempt was made to improve the hold time. It was thought that the presence in the adhesive composition of residual ammonia (a catalyst) from the endblocking agent (an ammonia odor was present after processing) might contribute to the low hold time, so a small amount of water was added during the manufacture of the silicone pressure-sensitive adhesive to enable more of the ammonia to be removed from the compositions during processing. In Example 12A, the water was added after the other ingredients were allowed to condense for a time under solvent reflux conditions. In Example 12B, a small amount of water was charged in the flask along with the other ingredients and then heating was started.

Example 12A had the following formulation: 308 g Resin A-1 (68.9% N.V.C.), 209 g PDOS B-1 (90% N.V.C.), 504 g xylene and 22 g hexamethyldisilazane. The ingredients were processed similar to Example 4 as follows: After the hexamethyldisilazane was added to the other mixed components (0 minutes, temperature was 29° C.), the mixture was allowed to stir until the heat was turned on after 15 minutes at a temperature of 31° C. Water evolution was noted after 45 minutes at 123° C. A total of 1.8 g of condensation by-product had been collected in the Dean Stark trap after 150 minutes (temperature was 136° C.). At this point, 1.8 ml of condensation by-product was removed and the material in the flask was cooled. At 80° C. (180 minutes), 7.2 g of water were added to the flask and heating was resumed. After 255 minutes, the temperature was 63° C. After 300 minutes, the temperature was 65° C. The temperature was increased until water evolution was observed at 91° C. after 330 minutes. After 345 minutes (temperature was 120° C.), 5.2 ml water had been collected. After 360 minutes, the temperature was 135° C. and 7.0 ml of water was collected. After 435 minutes, the temperature was 135° C. and the amount of water collected was still 7.0 ml. At this point, xylene solvent was stripped by removing it from the Dean Stark trap. After 455 minutes (temperature was 139° C.), a total of 308 g solvent was removed, the stripping process was terminated and the composition in the flask was cooled. The resulting silicone pressure-sensitive adhesive composition had an N.V.C. of 56.0% and a viscosity of 25,800 centipoise using spindle #4, speed=6. After 6 months of room temperature storage, the viscosity was 48,300 centipoise.

A simpler procedure was used in Example 12B. Example 12B had the same formulation as Example 12A except 524 g xylene was used and 7.2 g water was added to the other ingredients in the flask prior to the addition of the hexamethyldisilazane. The ingredients were then processed similar to Example 4 as follows: the hexamethyldisilazane was added to the other stirring ingredients at time 0 minutes (temperature was 30° C.) and an inert gas (nitrogen) purge was started. Heating was started at 31° C. after 15 minutes and the temperature was 63° C. after 30 minutes. After 45 minutes, (temperature was 114° C.) 4.6 ml of condensation by-product (water) was collected. After 60 minutes (temperature was 132° C.), 7.0 ml water was collected. After 135 minutes (temperature was 134° C.), a total of 7.8 ml of water had been collected and no further water was collected after 165 minutes (temperature was 134° C.) whereupon solvent stripping through the Dean-Stark trap was begun. A total of 316 g solvent was collected after 180 minutes (temperature was 138° C.) at which time stripping was terminated and the composition in the flask was cooled to room temperature. The resulting silicone pressure-sensitive adhesive composition had an N.V.C. of 56.1% and an initial viscosity of 36,600 centipoise using spindle #4, speed=6. After 6 months of room temperature storage, the viscosity was 56,000 centipoise.

Examples 12A and 12B were comparable in formulation to Example 11B with the exception of the water added during processing. The tack, adhesion and hold time for Examples 12A and 12B were determined on films of the adhesive made using compositions containing 1% and 2%, respectively, of benzoyl peroxide curing catalyst. Each film was cured 15 minutes at room temperature followed by 5 minutes at 150° C. on MYLAR ® polyester substrate. Hold time was measured as described previously using a ½ inch (12.7 mm) strip of MYLAR ® polyester film bearing a 500 g weight on the lower strip. The results were as follows:

| Ex. # | % B.P.[1] | Tack (g/cm²) | Adhesion (g/inch) | Hold Time (hrs) | Film (mil) |
|---|---|---|---|---|---|
| 12A | 1 | 750 | 1120 | 24 | 2.2 |
| 12A | 2 | 600 | 1060 | 30+ | 2.2 |
| 12B | 1 | 710 | 1170 | 2 | 1.5 |
| 12B | 2 | 695 | 1010 | 30+ | 2.1 |

[1]% benzoyl peroxide based on 100% N.V.C.

Thus, the tack and adhesion values of Examples 12A and 12B were close to those of Example 11B, but the hold time was improved. Hold time evaluation was discontinued after 30 hours.

EXAMPLE 13

In this example, a silicon-bonded hydroxyl endblocked polydiorganosiloxane fluid of lower molecular weight than those used in the previous examples was prepared using a precondensation step in the presence of a condensation catalyst (ammonium carbonate) and was prepared in accordance with the method of the present invention. Using the apparatus described in Example 4, 655 g. of Resin A-1 (73.3% N.V.C.) and 320 g. PDOS B-2 were placed in a flask and 8 g. of ammonium carbonate was added. The heat turned on (0 minutes) and the contents of the flask reached 50° C. after 15 minutes. The temperature had reached 70° after 25 minutes and was 80° C. after 40 minutes. After 65 minutes, the temperature was 90° C. and after 90 minutes the temperature was 105° C. After 105 minutes, 48 g. of hexamethyldisilazane was added and the rate of heating was increased. After 120 minutes, the temperature was 115° C. The heating was terminated after 210 minutes, the mixture was cooled and 625 g. xylene was added. A total of 14 ml of condensation by-product was collected, a small portion of which appeared to be crystalline in nature which was thought to be ammonium carbonate. The resulting pressure-sensitive adhesive had an N.V.C. of 61%, a viscosity of 600 centipoise using a Brookfield Model RVT Viscometer with a #4 spindle, speed=20. An air dried adhesive film had an adhesion value 888 g/inch and was tacky to the touch.

EXAMPLES 14-15

In these Examples, several different pressure-sensitive adhesive compositions (53 parts Resin A-1 and 47 parts PDOS B-1) were prepared in accordance with the method of the present invention using endblocking agents other than organosilazanes.

Example 14 had the following formulation: 144.3 g. Resin A-1, 99.5 g. PDOS B-1, 232.8 g. xylene and 23.3 g. trimethylmethoxysilane (about 150% of the stoichiometric amount). Since a trimethylmethoxysilane endblocking agent does not generate a silanol condensation catalyst upon hydrolysis, this is an example of a composition made without the addition of any additional silanol condensation catalyst. The procedure used was similar to that of Example 4: heat on at 27° C. (0 minutes) after the trimethylmethoxysilane was added to the other stirring ingredients in the flask, after 15 minutes the temperature was 34° C., after 235 minutes (temperature was 132° C.) stripping of organic solvent was commenced using the Dean-Stark trap, and the heat was turned off after 259 minutes (temperature was 138° C.) at which time a total of 164 g. of solvent was stripped. The viscosity of the resulting silicone pressure-sensitive adhesive was 26,000 centistokes (about 26,000 centipoise, spindle #4, speed=6) at 58.6% N.V.C. The tack, adhesion and creep (high temperature lap shear stability) of the resulting adhesive was evaluated using 2% benzoyl peroxide curing agent based on 100% N.V.C. of the adhesive. For a film thickness of 1.5 mils, the tack value was 450 g/cm$^2$ and the adhesion value was 860 g/inch. Surprisingly, this adhesive was found to pass the creep (high temperature lap shear stability) test which is a difficult test to pass. This adhesive would be expected to have a very good hold time.

Example 15 had the following formulation: 144 g. Resin A-1, 99.5 g. PDOS B-1, 232.5 g. xylene and 24 g. trimethylchlorosilane (about 150% of the stoichiometric amount). The procedure used was the same as in Example 14: heat on at 26° C. (0 minutes), the temperature was 35° C. after 15 minutes, solvent stripping was started at 225 minutes (temperature was 137° C.) and solvent stripping was concluded and the heat turned off after 250 minutes (temperature was 150° C.) when 166 g. solvent was stripped out. The viscosity of the resulting silicone pressure-sensitive adhesive was 50,500 centistokes (about 50,500 centipoise) at 58.3% N.V.C. The tack, adhesion and creep (high temperature lap shear stability) of the resulting adhesive was evaluated using 2% benzoyl peroxide curing agent based on 100% N.V.C. of the adhesive. For a film thickness of 1.8 mils, the tack value was 480 g/cm$^2$ and the adhesion value was 920 g/inch. The composition failed the creep test unlike Example 14. This may be due to residual hydrogen chloride. When water was added to a composition similar to that of Example 15 to attempt to remove the hydrogen chloride, the composition had a very low viscosity and was presumed to have undergone significant depolymerization as a result of the formation of hydrochloric acid.

EXAMPLE 16

This Example demonstrates one aspect of the versatility of the method of the present invention which is to enable one to easily incorporate various types of functional radicals into silicone pressure-sensitive adhesive compositions. When 13.7 g (Me$_3$Si)$_2$NH and 16 g (ViMe$_2$Si)$_2$NH are substituted for the 60 g (Me$_3$Si)$_2$NH employed in Example 6 and the method described in that Example is practiced, a silicone pressure-sensitive adhesive composition is produced. This pressure-sensitive adhesive composition will contain both Me$_3$Si— and ViMe$_2$Si— endblocking triorganosilyl units wherein the vinyl radicals present are available for further reaction as desired.

EXAMPLES 17-18

These Examples illustrate the use of a fluorine-containing endblocking agent to prepare pressure-sensitive adhesive compositions of the present invention. Example 17 employes (CF$_3$CH$_2$CH$_2$Me$_2$Si)$_2$NH as an endblocking agent in conjunction with resin copolymer and polydiorganosiloxane which contain methyl radicals as the silicon-bonded organic radicals. Example 18 employs the same endblocking agent in conjunction with a resin copolymer containing methyl radicals as the silicon-bonded organic radicals and both methyl and 3,3,3-trifluoropropyl radicals present in the polydiorganosiloxane used to prepare the pressure-sensitive adhesive composition. In Example 17, 550 parts of Resin A-1 (70% N.V.C.), 350 parts of PDOS B-1 (90% N.V.C.), 675 parts by weight of xylene and 84 parts of (CF$_3$CH$_2$CH$_2$Me$_2$Si)$_2$NH are processed in a manner similar to that of Example 6 over a period of eight hours or longer until a single phase mixture is obtained. A small amount of solvent is stripped during the last hour to obtain a composition having an N.V.C. of about 50%. This composition contains a ratio of 55 parts of Resin A-1 to 45 parts of PDOS B-1 on a 100% N.V.C. basis. Assuming that the silicon-bonded hydroxyl content of the Resin A-1 is 2.5% based on 100% N.V.C. and that of the PDOS B-1 is very small relative to that of the Resin A-1, the ratio of triorganosilyl endblocking units to silicon-bonded hydroxyl radicals is about 0.9:1. After the composition is catalyzed with 2% by weight of benzoyl peroxide based on the N.V.C. of the composition and a film of the catalyzed composition is cured for 5 minutes at 150° C., the cured film is tacky to the touch and can be used as a pressure-sensitive adhesive.

In Example 18, when 235 parts of Resin A-1 (70% N.V.C.), 135 parts of a hydroxyl-endblocked poly-(3,3,3-trifluoropropylmethylsiloxane) having a viscosity in the range of 30,000 to 50,000 centipoise at 25° C. (100% N.V.C.), 223 parts of methylisobutyl ketone and 36 g of $(CF_3CH_2CH_2Me_2Si)_2NH$ are processed as in Example 10G for a total period of about 6 hours wherein a total of about 240 ml of solvent is stripped off in increments of 100 ml, 120 ml and 20 ml beginning at 75 minutes, 195 minutes and 270 minutes, respectively, after the initial time at which heating of the mixture is begun, a pressure-sensitive adhesive composition having an N.V.C. of about 80% is obtained. The ratio of Resin A-1 to polydiorganosiloxane is 55:45 based on 100% N.V.C. Assuming the Resin A-1 has a silicon-bonded hydroxyl content of about 2.5% and that the silicon-bonded hydroxyl content of the polydiorganosiloxane is about 0.1%, the ratio of triorganosilyl endblocking units to silicon-bonded hydroxyl radicals is about 0.9:1. When the composition is catalyzed with 5% benzoyl peroxide based on 100% N.V.C. and cured as a film for 5 minutes at 150° C., the cured film is sticky to the touch and can be used as a pressure-sensitive adhesive.

That which is claimed is:

1. A method of making a silicone pressure-sensitive adhesive composition possessing improved stability upon aging which comprises the steps of:
(I) mixing
    (A) from 40 to 70 inclusive parts by weight of at least one benzene-soluble resin copolymer containing silicon-bonded hydroxyl radicals and consisting essentially of $R_3SiO_{\frac{1}{2}}$ units and $SiO_{4/2}$ units in a mole ratio of from 0.6 to 0.9 $R_3SiO_{\frac{1}{2}}$ units for each $SiO_{4/2}$ unit present,
    (B) from 30 to 60 parts by weight of at least one polydiorganosiloxane consisting essentially of ARSiO units terminated with endblocking $TRASiO_{\frac{1}{2}}$ units, each said polydiorganosiloxane having a viscosity of from 100 centipoise to 30,000,000 centipoise at 25° C., and each T is R— or X—,
    (C) a sufficient amount of at least one organosilicon endblocking agent capable of generating an endblocking triorganosilyl unit selected from the group consisting of $ZR_2Si$— units, $CH_3Z'$—units, $RZ''$— units and $Z'''R_2Si$ units to provide a 1:0.8 to 1:3 mole ratio of total silicon-bonded hydroxyl and X radicals present in said (A) and (B) to total endblocking triorganosilyl units provided by all endblocking agent present, said agent being selected from the group consisting of $ZR_2SiY$, $(ZR_2Si)_qD$, $CH_3Z'Y$, $(CH_3Z')_2O$, $RZ''Y'$, $(RZ'')_2O$ and $Z'''R_2SiY'$,
    (D) optionally, an additional catalytic amount of a mild silanol condensation catalyst, and
    (E) when necessary, an effective amount of an organic solvent which is inert with respect to (A), (B), (C) and (D) to reduce the viscosity of a mixture of (A), (B), (C), and (D), and
(II) condensing the mixture of (A), (B), (C) and (D) at least until a substantial amount of the endblocking triorganosilyl units have reacted with the silicon-bonded hydroxyl radicals and X radicals of said (A) and (B), wherein each R is a monovalent organic radical selected from the group consisting of hydrocarbon radicals of from 1 to 6 inclusive carbon atoms, each X radical is selected from the group consisting of HO—, H— and R'O— radicals, each R' is an alkyl radical of from 1 to 4 inclusive carbon atoms, each Y radical is a monovalent hydrolyzable organic radical or HO—, each Y' is HO— or a monovalent hydrolyzable organic radical free of nitrogen, each A radical is selected from the group consisting of R— and halohydrocarbon radicals of from 1 to 6 inclusive carbon atoms, each Z radical is A— or QR''—, each R'' is a divalent alkylene radical of from 1 to 6 inclusive carbon atoms, each Q is an organofunctional monovalent radical selected from the group consisting of RCOE', RE'OC—, NC—, R'E'—, HO—, $G_2N$—, $HO(R''O)_n$—, and $G_2NCH_2CH_2NG$—, where E' is —O—, —NG— or —S—, n has a value of from 1 to 6, Z' is

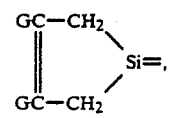

Z'' is

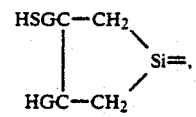

Z''' is selected from the group consisting of HSR''—, $HSCH_2CH_2NGR''$— and $HOCH_2CH_2SR''$— radicals, each G is R— or H—, D is a divalent or trivalent radical capable of being hydrolyzed to release said endblocking silyl units and q has a value of 2 when D is a divalent radical and q has a value of 3 when D is a trivalent radical.

2. The method as claimed in claim 1 wherein Y is selected from the group consisting of R'O—, HO—, Cl—, and $G_2N$— radicals, D is selected from the group consisting of —O—, —NG— and —NHCONH—, said (A) is free of aliphatically unsaturated radicals when (B) contains such radicals and said (B) is free of aliphatically unsaturated radicals when (A) contains such radicals, and the endblocking agent of (C) is selected from the group consisting of $ZR_2SiY$, $(ZR_2Si)_2D$, and mixtures thereof.

3. The method as claimed in claim 1 wherein said $R_3SiO_{\frac{1}{2}}$ units present in said copolymer of (A) are $(CH_3)_2R'''SiO_{\frac{1}{2}}$ units wherein each R''' is selected from the group consisting of methyl, vinyl, and phenyl radicals, said ARSiO units of (B) are selected from the group consisting of $R'''_2SiO$ units, $(C_6H_5)_2SiO$ units and combinations of both, said $TRASiO_{\frac{1}{2}}$ endblocking units of (B) being of the unit formula $(HO)R'''CH_3SiO_{\frac{1}{2}}$, at least 50 mole percent of the R''' radicals present in said (B) being methyl radicals and no more than 50 mole percent of the total moles of ARSiO units present in each polydiorganosiloxane of said (B) are $(C_6H_5)_2SiO$ units, the endblocking agent of (C) is selected from the group consisting of $ZR_2SiY$, $(ZR_2Si)_2D$ and, mixtures thereof, D is selected from the group consisting of —O—, —NG— and —NHCONH—, each Y radical is selected from the group consisting of R'O—, Cl—, HO— and $G_2N$—, each R present in said endblocking agent is selected from the group consisting of methyl and phenyl radicals and Z is selected from the group consisting of methyl, vinyl and 3,3,3-trifluoropropyl radicals, wherein (A) is free of aliphatically unsaturated radicals when (B) contains such radicals and (B) is free of aliphatically unsaturated radicals when (A) contains such radicals and wherein condensation step (II) is conducted at least until the rate of evolution of condensation reaction by-products is substantially constant.

4. The method as claimed in claim 3 wherein the mixture prepared in Step I further contains a hydrocarbon solvent selected from the group consisting of benzene, toluene and xylene and the condensation reaction of Step II is conducted with heating 80° to 160° C.

5. The method as claimed in claim 4 wherein no more than 10 mole percent of the $R_3SiO_{\frac{1}{2}}$ units present in said (A) are $(CH_3)_2R''''SiO_{\frac{1}{2}}$ units, the remaining $R_3SiO_{\frac{1}{2}}$ units are $(CH_3)_3SiO_{\frac{1}{2}}$ units, said R'''' radicals being methyl or vinyl radicals and no more than 10 mole percent of said ARSiO units of (B) being of the unit formula $CH_3R''''SiO$ and the remaining ARSiO units present in said (B) are $(CH_3)_2SiO$ units, Z is a methyl or vinyl radical, the amount of said (A) being in the range of from 45 to 60 inclusive parts by weight, and the amount of said (B) being in the range of 40 to 55 inclusive parts by weight.

6. The method as claimed in claim 4 wherein the polydiorganosiloxane of (B) has a viscosity at 25° C. of greater than 100,000 centipoise, the solvent being present in an amount which is such that the solvent comprises from 30 to 70 weight percent of the total weight of the mixture of (A), (B), (C), (D) and (E).

7. The method as claimed in claim 3 wherein the endblocking agent is $(AR_2Si)_2NH$, $AR_2SiOR'$ or $AR_2SiCl$ and no additional catalyst (D) is present in the mixture.

8. The method as claimed in claim 5 wherein the endblocking agent is $(AR_2Si)_2NH$, $AR_2SiOR'$ or $AR_2SiCl$ and no additional catalyst (D) is present in the mixture.

9. The method as claimed in claim 6 wherein the endblocking agent is $(AR_2Si)_2NH$, $AR_2SiOR'$ or $AR_2SiCl$, Z is a methyl or vinyl radical and no additional catalyst (D) is present in the mixture.

10. The method as claimed in claim 1 wherein Step (I) comprises the Steps of (Ia) mixing (A), (B) and any (E) together in the presence of a silanol condensation catalyst, (Ib) condensing said (A) and (B) to form a condensed product and (Ic) mixing the product of Step (Ib) with (C), any (D) and any further amount of (E) which is necessary prior to proceeding with Step (II), said polydiorganosiloxane of (B) having a viscosity of from 100 to 100,000 centipoise at 25° C.

11. The method as claimed in claim 3 wherein Step (I) comprises the Steps of (Ia) mixing (A), (B) and any (E) together in the presence of a silanol condensation catalyst, (Ib) condensing said (A) and (B) to form a condensed product and (Ic) mixing the product of Step (Ib) with (C), any (D) and any further amount of (E) which is necessary prior to proceeding with Step (II), said polydiorganosiloxane of (B) having a viscosity of from 100 to 100,000 centipoise at 25° C.

12. The method as claimed in claim 5 wherein Step (I) comprises the Steps of (Ia) mixing (A), (B) and any (E) together in the presence of a silanol condensation catalyst, (Ib) condensing said (A) and (B) to form a condensed product and (Ic) mixing the product of Step (Ib) with (C), any (D) and any further amount of (E) which is necessary prior to proceeding with Step (II), said polydiorganosiloxane of (B) having a viscosity of from 100 to 100,000 centipoise at 25° C.

13. The method as claimed in claim 11 wherein the endblocking agent is $(AR_2Si)_2NH$, $AR_2SiOR'$ or $AR_2SiCl$.

14. The method as claimed in claim 12 wherein the endblocking agent is $(AR_2Si)_2NH$, $AR_2SiOR'$ or $AR_2SiCl$.

15. A pressure-sensitive adhesive composition comprising the product obtained from the method of claim 1.

16. A pressure-sensitive adhesive composition comprising the product obtained from the method of claim 2.

17. A pressure-sensitive adhesive composition comprising the product obtained from the method of claim 3.

18. A pressure-sensitive adhesive composition comprising the product obtained from the method of claim 4.

19. A pressure-sensitive adhesive composition comprising the product obtained from the method of claim 5.

20. A pressure-sensitive adhesive composition comprising the product obtained from the method of claim 6.

21. A pressure-sensitive adhesive composition comprising the product obtained from the method of claim 7.

22. A pressure-sensitive adhesive composition comprising the product obtained from the method of claim 8.

23. A pressure-sensitive adhesive composition comprising the product obtained from the method of claim 9.

24. A pressure-sensitive adhesive composition comprising the product obtained from the method of claim 10.

25. A pressure-sensitive adhesive composition comprising the product obtained from the method of claim 11.

26. A pressure-sensitive adhesive composition comprising the product obtained from the method of claim 12.

27. A pressure-sensitive adhesive composition comprising the product obtained from the method of claim 13.

28. A pressure-sensitive adhesive composition comprising the product obtained from the method of claim 14.

29. A pressure-sensitive adhesive composition comprising a blend of the product obtained from the method of claim 1 with less than about 30 weight percent based on nonvolatile solids content of a modifier comprising from 1 to 100 parts by weight of a silicone resin copolymer consisting essentially of $R_3SiO_{\frac{1}{2}}$ units and $SiO_{4/2}$ units in a mole ratio of from 0.6 to 0.9 $R_3SiO_{\frac{1}{2}}$ units for each $SiO_{4/2}$ unit present and from 0 to 99 parts by weight of at least one polydiorganosiloxane consisting essentially of ARSiO units terminated with endblocking $TRASiO_{\frac{1}{2}}$ units, each said polydiorganosiloxane having a viscosity of from 100 centipoise to 30,000,000 centipoise at 25° C.

30. A pressure-sensitive adhesive composition comprising a blend of the product obtained from the method of claim 3 with less than about 30 weight percent based on nonvolatile solids content of a modifier comprising from 1 to 100 parts by weight of a silicone resin copolymer consisting essentially of $R_3SiO_{\frac{1}{2}}$ units and $SiO_{4/2}$ units in a mole ratio of from 0.6 to 0.9 $R_3SiO_{\frac{1}{2}}$ units for each $SiO_{4/2}$ unit present and from 0 to 99 parts by weight of at least one polydiorganosiloxane consisting essentially of ARSiO units terminated with endblocking $TRASiO_{\frac{1}{2}}$ units, each said polydiorganosiloxane having a viscosity of from 100 centipoise to 30,000,000 centipoise at 25° C.

31. A pressure-sensitive adhesive composition comprising a blend of the product obtained from the method of claim 5 with less than about 30 weight percent based on nonvolatile solids content of a modifier comprising from 1 to 100 parts by weight of a silicone resin copolymer consisting essentially of $R_3SiO_{\frac{1}{2}}$ units and $SiO_{4/2}$ units in a mole ratio of from 0.6 to 0.9 $R_3SiO_{\frac{1}{2}}$ units for each $SiO_{4/2}$ unit present and from 0 to 99 parts by weight of at least one polydiorganosiloxane consisting essentially of ARSiO units terminated with endblocking $TRASiO_{\frac{1}{2}}$ units, each said polydiorganosiloxane having a viscosity of from 100 centipoise to 30,000,000 centipoise at 25° C.

32. A pressure-sensitive adhesive composition comprising a blend of the product obtained from the method of claim 6 with less than about 30 weight percent based on nonvolatile solids content of a modifier comprising from 1 to 100 parts by weight of a silicone resin copolymer consisting essentially of $R_3SiO_{\frac{1}{2}}$ units and $SiO_{4/2}$ units in a mole ratio of from 0.6 to 0.9 $R_3SiO_{\frac{1}{2}}$ units for each $SiO_{4/2}$ unit present and from 0 to 99 parts by weight of at least one polydiorganosiloxane consisting essentially of ARSiO units terminated with endblocking $TRASiO_{\frac{1}{2}}$ units, each said polydiorganosiloxane having a viscosity of from 100 centipoise to 30,000,000 centipoise at 25° C.

33. The method as claimed in claim 1 wherein Y is R'O— or Cl—.

34. A pressure-sensitive adhesive composition comprising the product obtained from the method of claim 33.

* * * * *